(12) United States Patent
Okamoto et al.

(10) Patent No.: US 8,220,431 B2
(45) Date of Patent: Jul. 17, 2012

(54) ENGINE WITH A BALANCER MECHANISM

(75) Inventors: Naoki Okamoto, Iwata (JP); Kazuhiro Ohta, Iwata (JP); Taketoshi Sano, Iwata (JP); Akimitsu Takeuchi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 862 days.

(21) Appl. No.: 11/571,824

(22) PCT Filed: Jul. 4, 2005

(86) PCT No.: PCT/JP2005/012317
§ 371 (c)(1),
(2), (4) Date: Oct. 10, 2008

(87) PCT Pub. No.: WO2006/006434
PCT Pub. Date: Jan. 19, 2006

(65) Prior Publication Data
US 2009/0211550 A1    Aug. 27, 2009

(30) Foreign Application Priority Data
Jul. 9, 2004  (JP) .................................. 2004-202512

(51) Int. Cl.
*F02B 75/06* (2006.01)
(52) U.S. Cl. .................... 123/192.2; 123/192.1
(58) Field of Classification Search ............... 123/192.1, 123/192.2
See application file for complete search history.

(56) References Cited

U.S. PATENT DOCUMENTS

| | | | | |
|---|---|---|---|---|
| 4,517,933 A * | 5/1985 | Yasutake | ...................... | 123/54.4 |
| 4,565,169 A * | 1/1986 | Suzuki | ........................ | 123/192.2 |
| 4,569,316 A * | 2/1986 | Suzuki | ........................ | 123/192.1 |
| 4,628,876 A * | 12/1986 | Fujikawa et al. | ........... | 123/192.2 |
| 4,690,111 A * | 9/1987 | Kohno et al. | ............... | 123/192.2 |
| 4,833,940 A * | 5/1989 | Ito | ................... | 74/595 |
| 5,065,644 A * | 11/1991 | Shimada | ........................ | 74/603 |
| 5,875,753 A * | 3/1999 | Ishikawa | ..................... | 123/192.2 |
| 6,763,586 B2 * | 7/2004 | Schliemann et al. | ...... | 29/888.08 |
| 6,907,850 B2 * | 6/2005 | Creel | ........................ | 123/71 R |
| 6,990,942 B2 * | 1/2006 | Takeuchi | ..................... | 123/192.2 |
| 7,104,239 B2 * | 9/2006 | Kawakubo et al. | ........ | 123/192.2 |

(Continued)

FOREIGN PATENT DOCUMENTS

JP     61-180043     8/1986

(Continued)

OTHER PUBLICATIONS

Machine Translation of JP 11-182393A.*

(Continued)

*Primary Examiner* — Noah Kamen
*Assistant Examiner* — Long T Tran
(74) *Attorney, Agent, or Firm* — Keating & Bennett, LLP

(57) ABSTRACT

An engine includes a crank mechanism and a balancer mechanism that inhibits vibrations caused by the crank mechanism. An instantaneous center of rotation of an engine is arranged in the neighborhood of a predetermined target position by adjusting an acceleration caused by a translational force generated by a primary inertial force of the crank mechanism and an inertial force of the balancer mechanism and an acceleration caused by a couple of forces generated by the primary inertial force of the crank mechanism and the inertial force of the balancer mechanism.

8 Claims, 16 Drawing Sheets

U.S. PATENT DOCUMENTS

2001/0020462 A1     9/2001    Ohyama et al.
2006/0028751 A1*   2/2006    Takeuchi ........................ 360/55

FOREIGN PATENT DOCUMENTS

| JP | 61180043 A | * | 8/1986 |
|---|---|---|---|
| JP | 2001-088787 | | 4/2001 |
| JP | 2003-214175 | | 7/2003 |
| JP | 2003-237674 | | 8/2003 |

OTHER PUBLICATIONS

Machine Translation of JP 61180043A.*
International Search Report for Application No. PCT-JP2005-012317 (the PCT counterpart of the National Phase application) mailed Oct. 4, 2005.
Search report for European Application No. 05 76 5230 (the European counterpart of the parent application) mailed Aug. 16, 2007.

* cited by examiner

[Fig. 1]
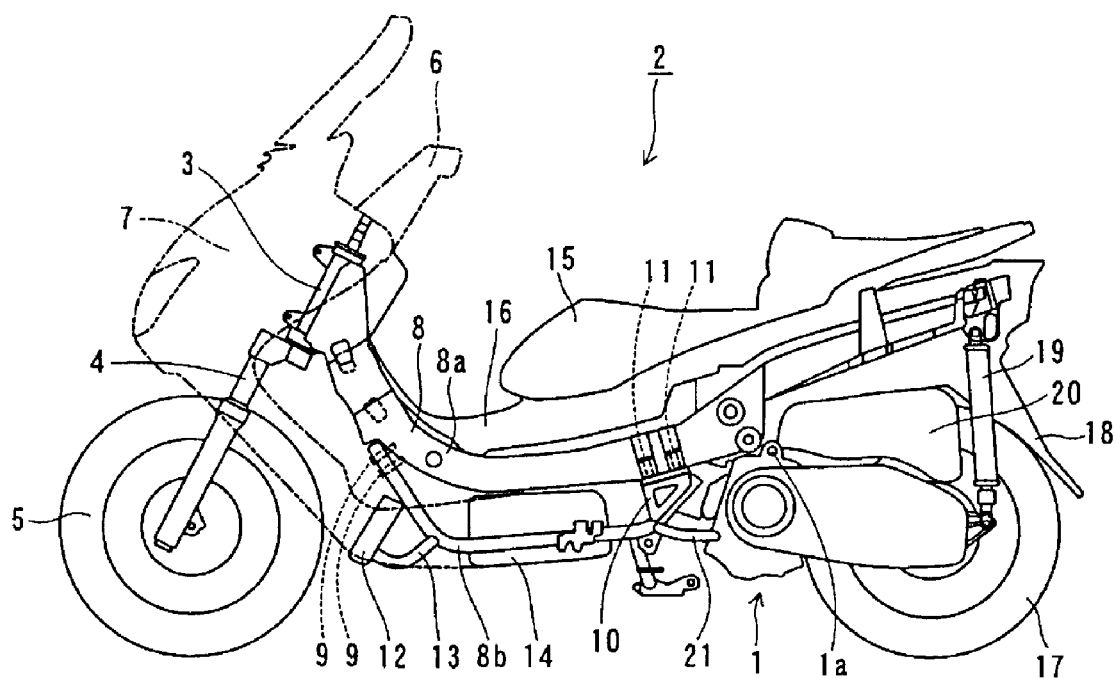

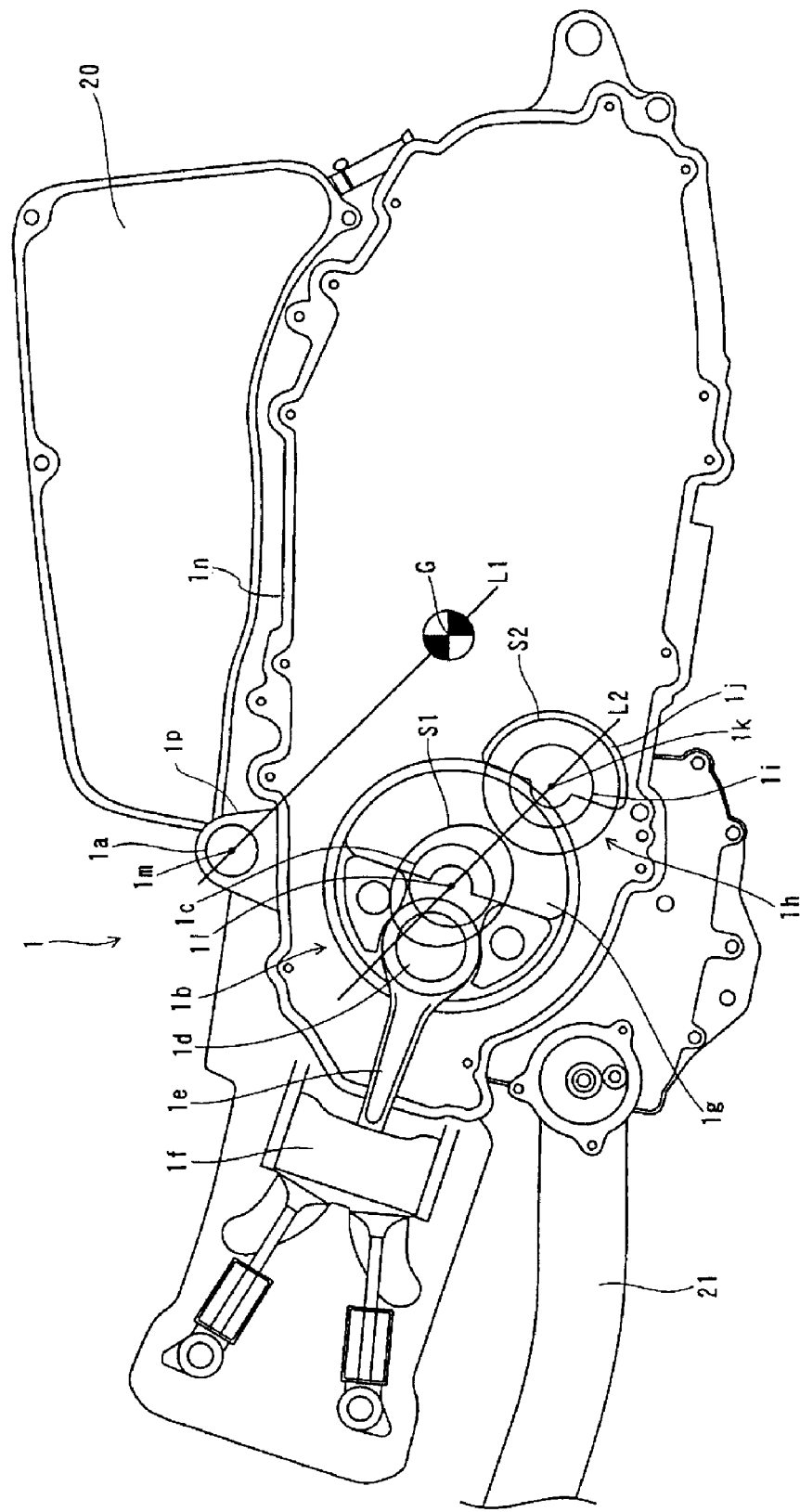
[Fig. 2]

[Fig. 3]
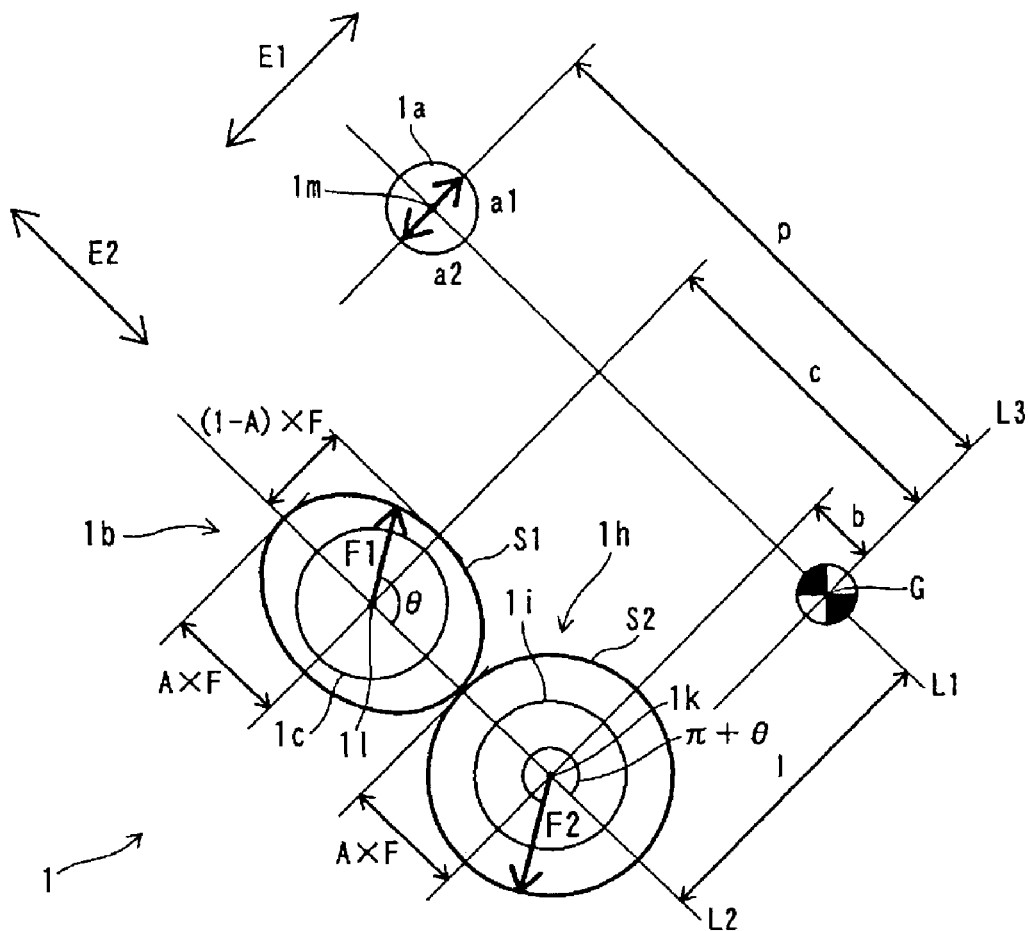

[Fig. 4]
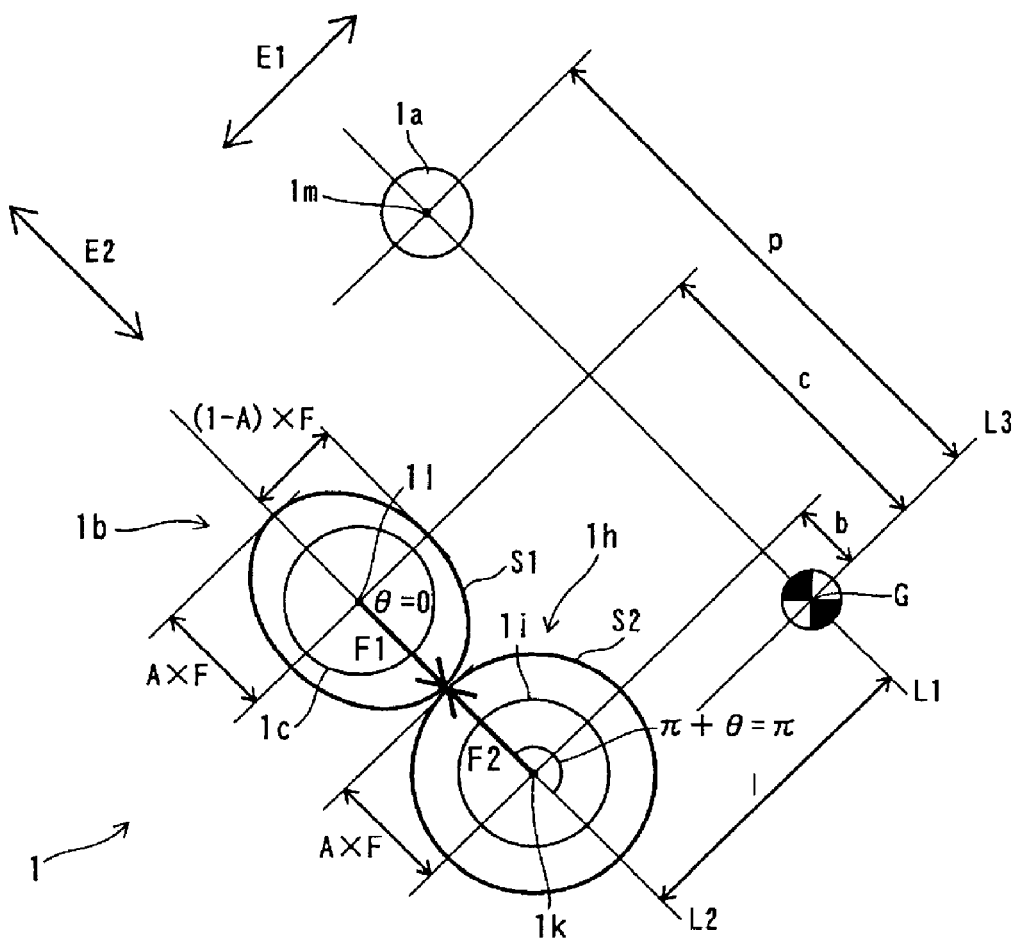

[Fig. 5]
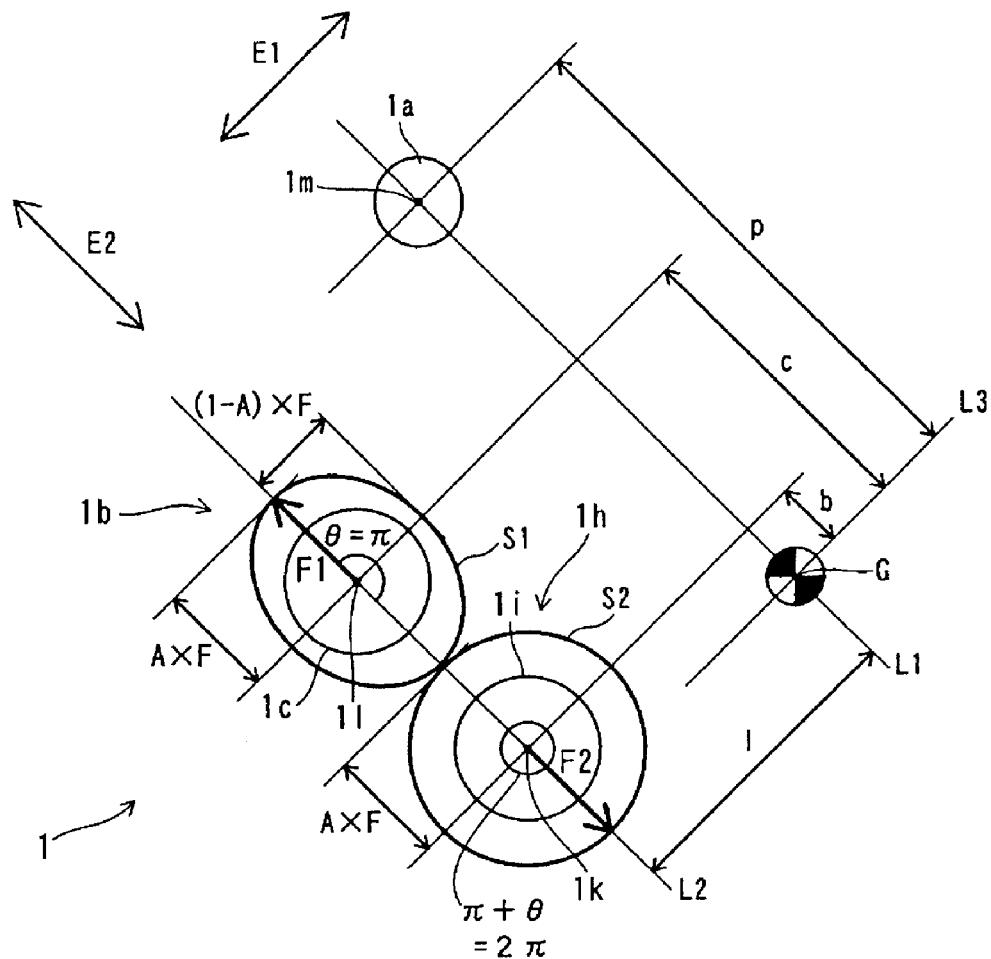

[Fig. 6]
POSITIONAL RELATIONSHIP OF RESPECTIVE
POINTS AND PRIMARY INERTIAL FORCE ELLIPSE

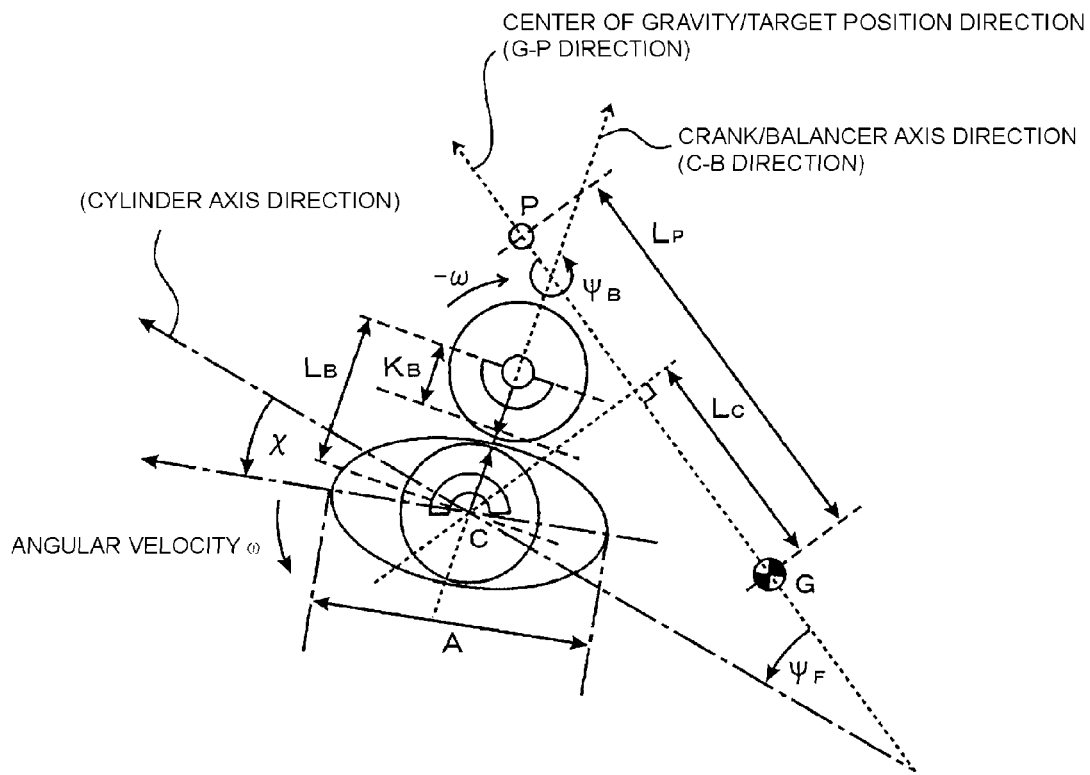

- C: CRANKSHAFT
- B: PRIMARY BALANCER SHAFT
- G: CENTER OF GRAVITY
- P: TARGET POSITION
- M: ENGINE MASS
- I: ENGINE INERTIAL MOMENT
- $L_P$: DISTANCE BETWEEN POSITION (REFERRED BELOW TO AS TARGET POSITION) OF INSTANTANEOUS CENTER OF ROTATION BEING A SET TARGET AND CENTER OF GRAVITY
- $L_B$: CRANK BALANCER CENTER DISTANCE
- $L_C$: DISTANCE BETWEEN CRANKSHAFT AND CENTER OF GRAVITY IN CENTER OF GRAVITY/TARGET POSITION DIRECTION
- $\Psi_B$: ANGLE OF CRANK/BALANCER AXIS DIRECTION WITH CENTER OF GRAVITY/TARGET POSITION DIRECTION AS A REFERENCE
- $\Psi_F$: ANGLE OF CYLINDER AXIS DIRECTION

[Fig. 7]
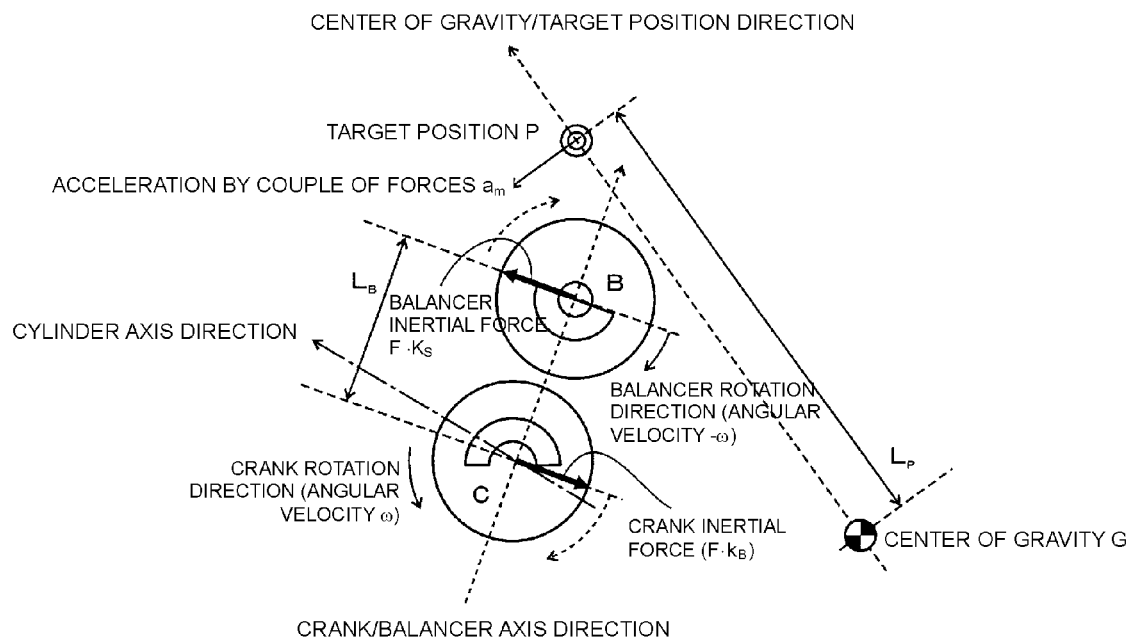
F: INERTIAL FORCE BY RECIPROCATING MASS
$K_B$: BALANCER BALANCE MAGNITUDE
$\theta$: CRANK ANGLE WITH POSITION OF MAXIMUM COUPLE OF FORCES AS A REFERENCE
I: EG INERTIAL MOMENT
C: CRANK
B: BALANCER

[Fig. 8]

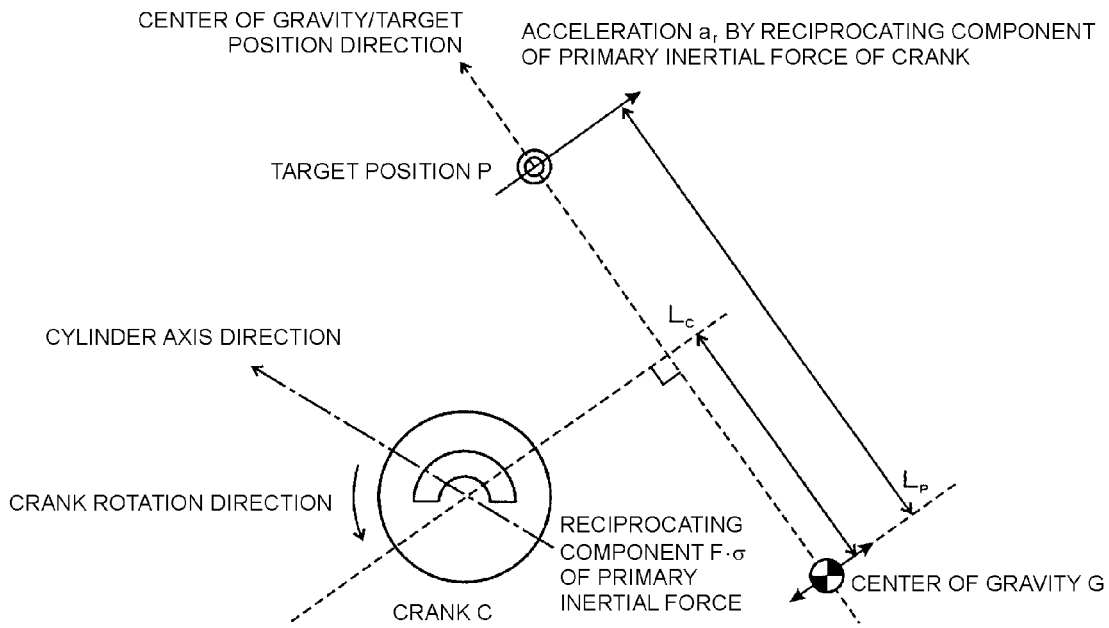

ACCELERATION BY RECIPROCATING COMPONENT OF PRIMARY INERTIAL FORCE $$a_r = F \cdot \sigma \cdot \cos\theta \cdot \left(\frac{1}{M} + \frac{L_C \cdot L_P}{I}\right)$$

$$= F \cdot \sigma \cdot \cos\theta \cdot \frac{I + M \cdot L_C \cdot L_P}{I \cdot M}$$

- F: INERTIAL FORCE BY RECIPROCATING MASS
- σ: MAGNITUDE OF RECIPROCATING COMPONENT OF PRIMARY INERTIAL FORCE
- θ: CRANK ANGLE WITH POSITION OF MAXIMUM COUPLE OF FORCES AS A REFERENCE
- M: EG MASS
- I: EG INERTIAL MOMENT

[Fig. 9]
DESIGN APPARATUS
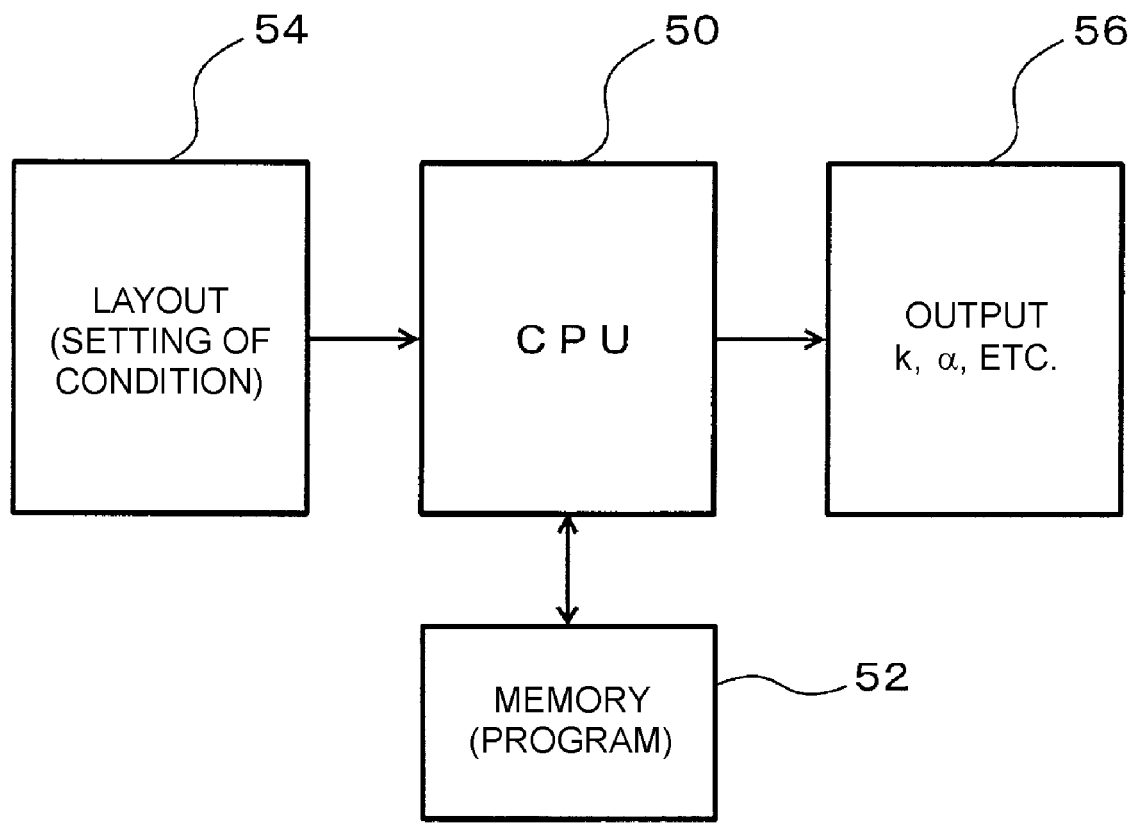

[Fig. 10]
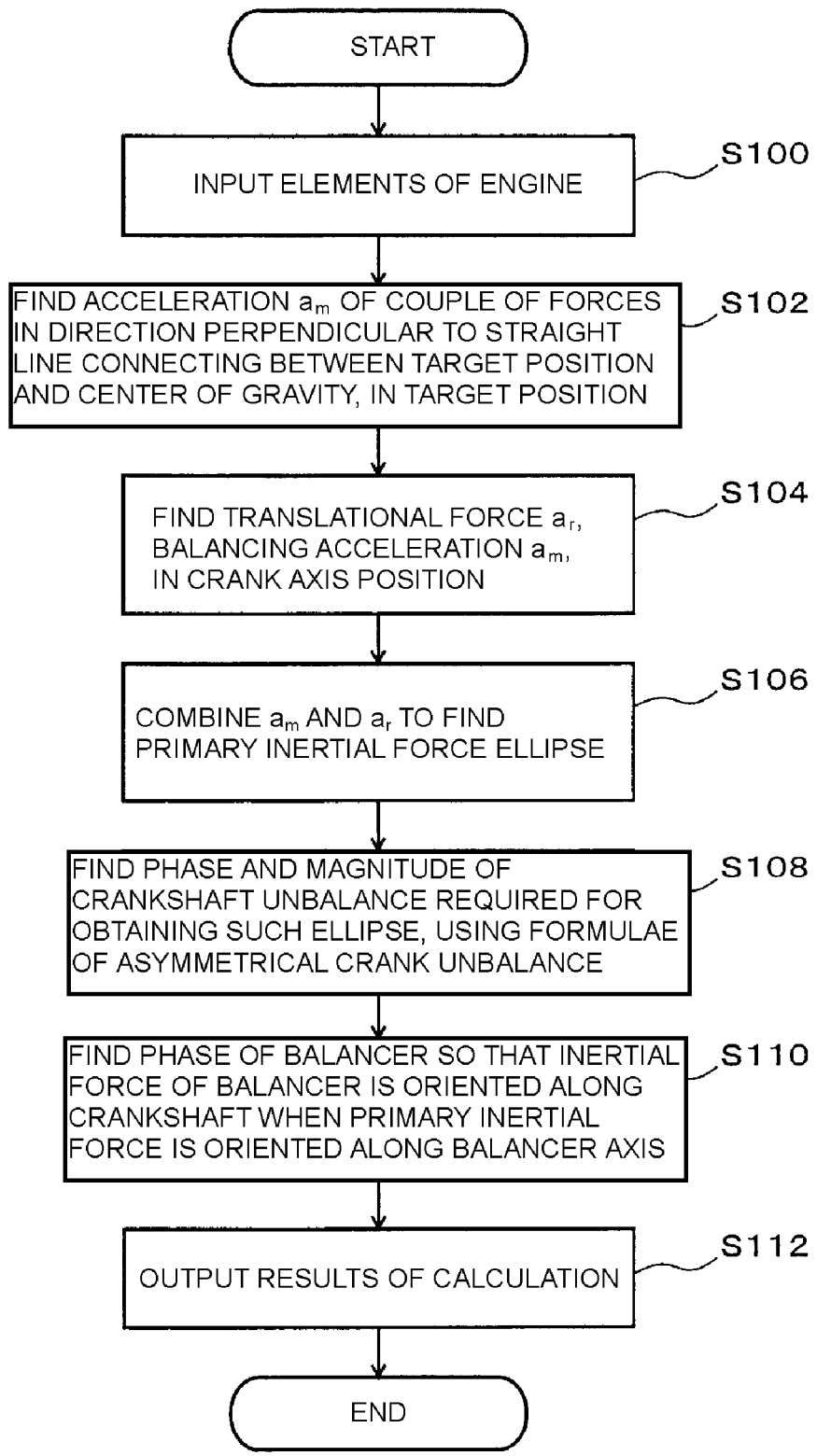

[Fig. 11]
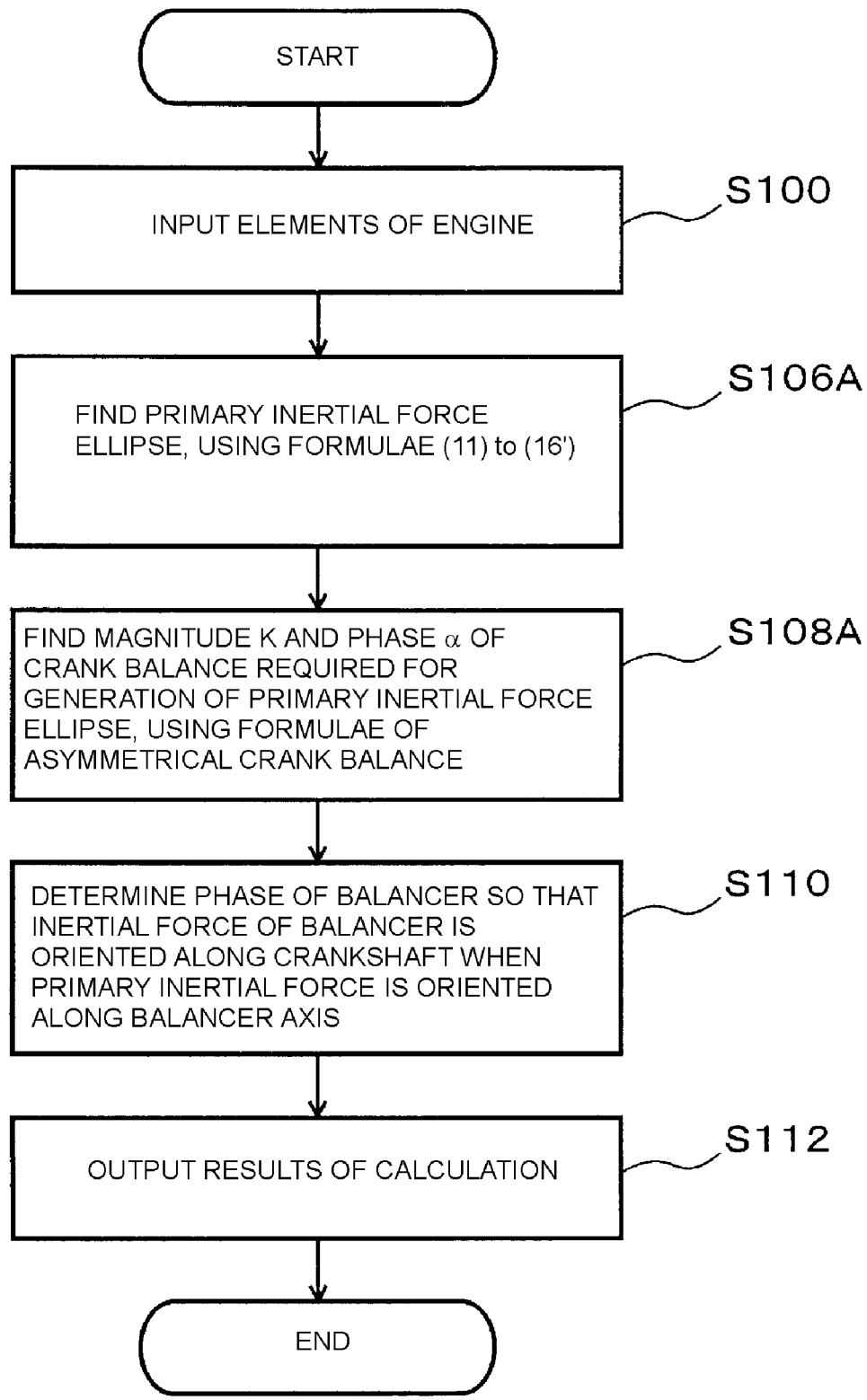

FORMULAE FOR FINDING OF INERTIAL FORCE ELLIPSE FROM CRANK BALANCE

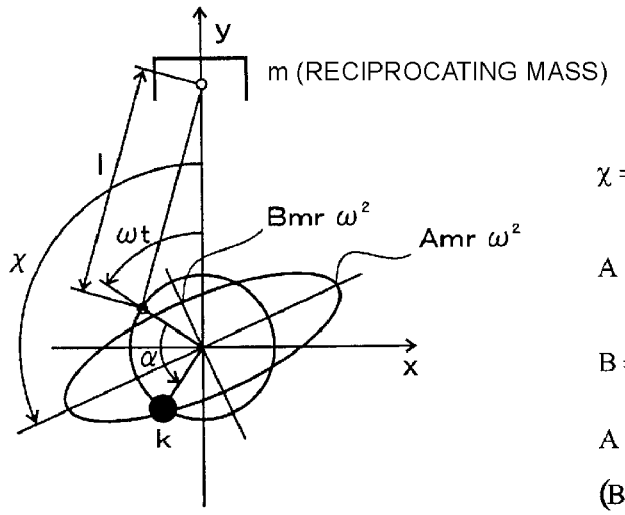

$$\chi = \frac{1}{2}\tan^{-1}\left(\frac{2k\sin\alpha}{1+2k\cos\alpha}\right)$$

$$A = 1 + \frac{k\cos(\alpha-\chi)}{\cos\chi} = \frac{k\sin(\alpha-\chi)}{\sin\chi}$$

$$B = \frac{k\cos(\alpha-\chi)}{\cos\chi} = -1 + \frac{k\sin(\alpha-\chi)}{\sin\chi}$$

$$A - B = 1$$

$$(B = A - 1)$$

(B)

FORMULAE FOR FINDING OF CRANK BALANCE FROM INERTIAL FORCE ELLIPSE

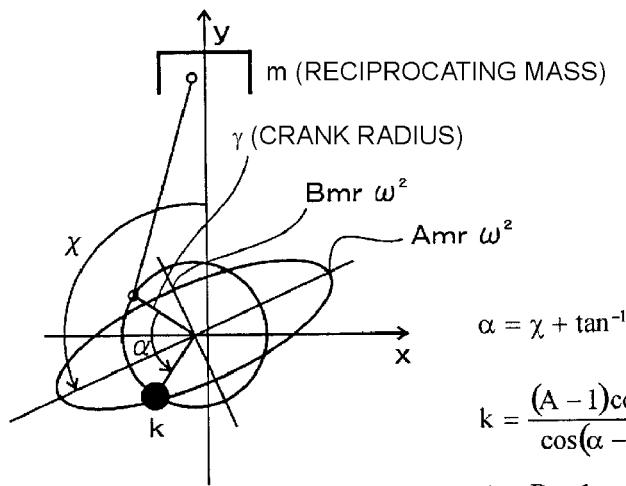

$$\alpha = \chi + \tan^{-1}\left(\frac{A\tan\chi}{A-1}\right) = \chi + \tan^{-1}\left(\frac{(B+1)\tan\chi}{B}\right)$$

$$k = \frac{(A-1)\cos\chi}{\cos(\alpha-\chi)} = \frac{A\sin\chi}{\sin(\alpha-\chi)}$$

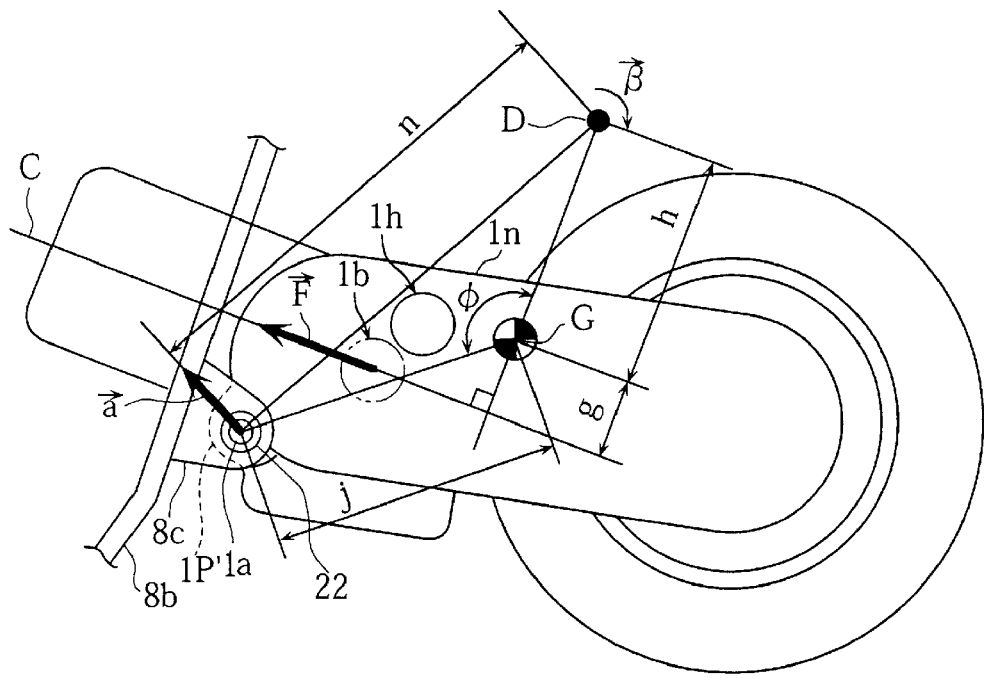

FOLLOWING EQUATIONS REPRESENT ANGULAR VELOCITY
OF OPTIONAL POINT a BY SECONDARY INERTIAL FORCE F $$\vec{a} = n \times \vec{\beta}$$

$$\begin{cases} \vec{F} = m_r \times r \times \varpi^2 \times \cos(2\theta)/\lambda & \text{(SECONDARY INERTIAL FORCE)} \\ \vec{\beta} = \vec{F} \times g/I & \text{(ANGULAR VELOCITY ABOUT I.C)} \\ n = \sqrt{j^2 \times h^2 - 2jh \times \cos(\phi)} & \text{(THEOREM OF COSINES)} \\ h = I/(M \times g) \end{cases}$$

[Fig. 14]
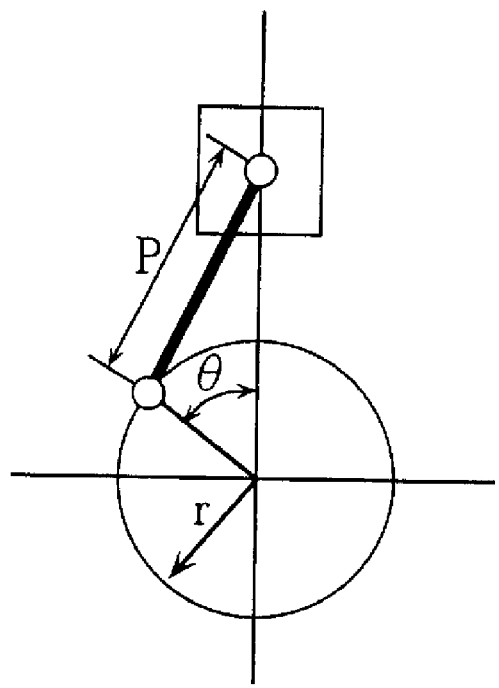
$m_r$: RECIPROCATING MASS
r: CRANK RADIUS
ω: CRANK ANGULAR VELOCITY
θ: PHASE
λ: CONNECTING-ROD RATIO
p: LENGTH OF CONNECTING ROD
I: INERTIAL MOMENT
M: ENGINE MASS

[Fig. 15]
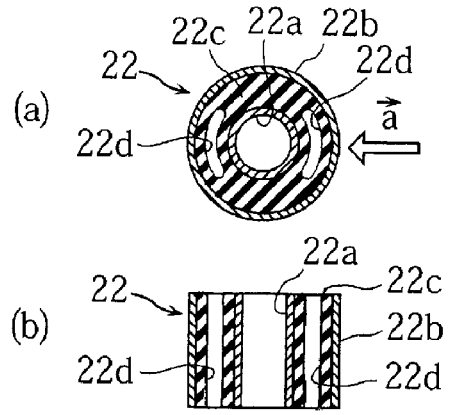
[Fig. 16]
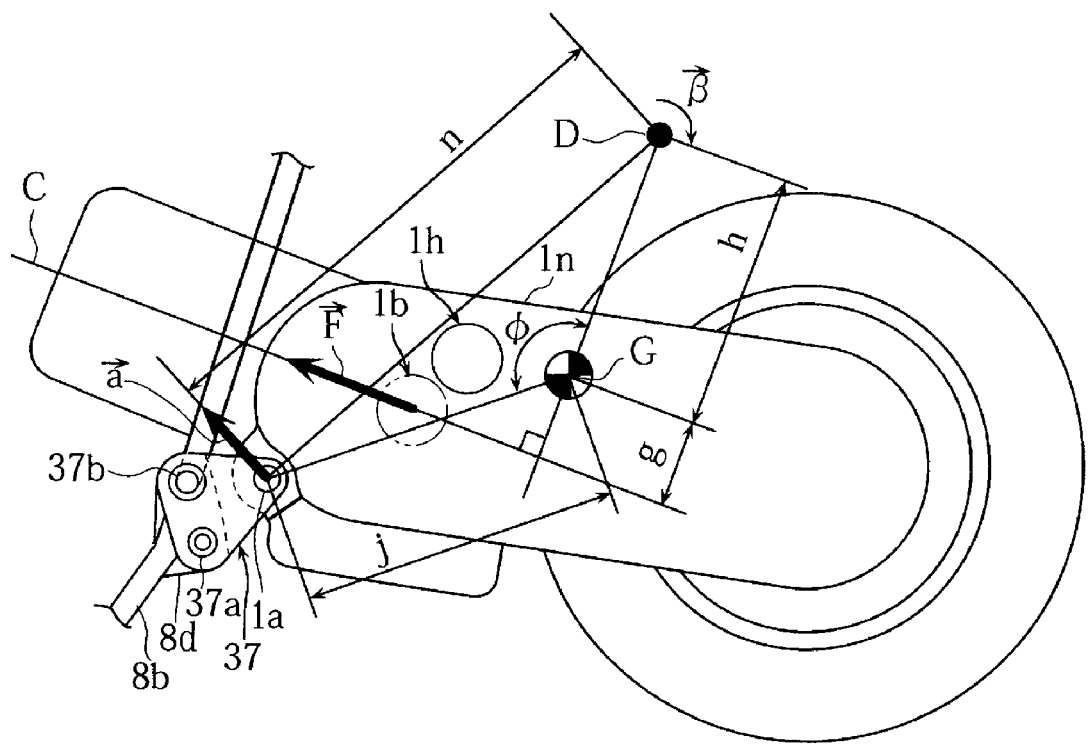

[Fig. 17]
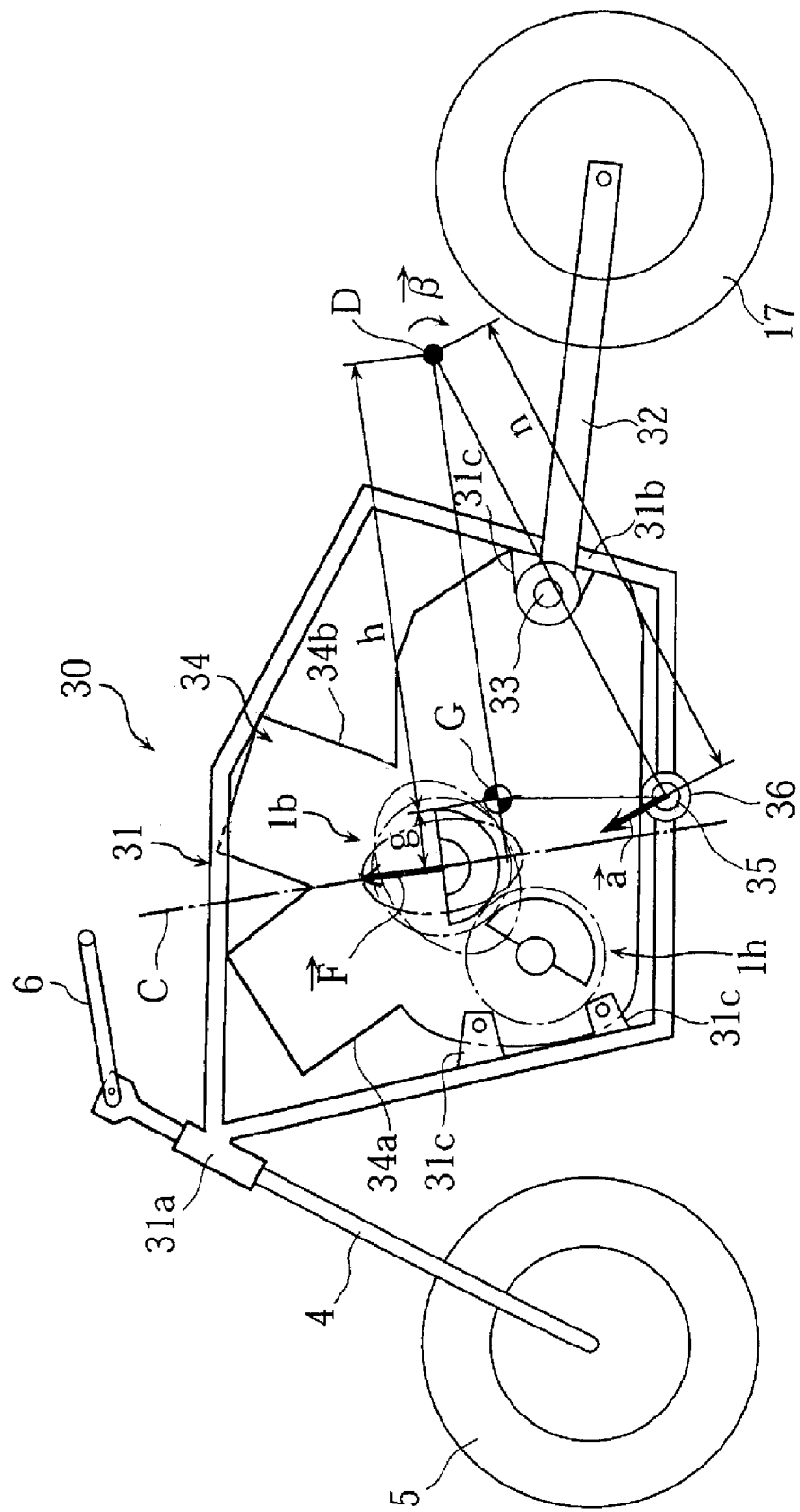

ENGINE WITH A BALANCER MECHANISM

RELATED APPLICATIONS

This application is the U.S. national phase of PCT Application No. PCT/JP2005/012317, filed Jul. 4, 2005, which claims priority to Japanese Application No. 2004-202512, filed Jul. 9, 2004, both of which are hereby incorporated by reference in their entirety.

BACKGROUND OF THE INVENTION

1. Field of the Invention

The present invention relates to an engine provided with a crank mechanism and a balancer mechanism that inhibits vibrations caused by the crank mechanism.

2. Description of the Related Art

Conventionally, there is known an engine provided with a crank mechanism and a balancer mechanism that inhibits vibrations caused by the crank mechanism (see, for example, JP-A-2003-237674).

JP-A-2003-237674 discloses a scooter type motorcycle mounted thereon a uniaxial balancer mechanism for generation of an inertial force, which is reversed in direction to and has the same magnitude as that of a primary inertial force of a crank mechanism, in order to lessen vibrations caused by the primary inertial force of the crank mechanism.

Since the construction disclosed in JP-A-2003-237674 is set such that a vectorial locus of a primary inertial force of a crank mechanism is made a circle and an inertial force of a balancer mechanism is reversed in direction to and has the same magnitude as that of the primary inertial force of the crank mechanism in all phases, no translational force is generated by the primary inertial force of the crank mechanism and the inertial force of the balancer mechanism. Thereby, it is possible to inhibit vibrations caused by a translational force generated by the primary inertial force of the crank mechanism and the inertial force of the balancer mechanism.

Since a balancer shaft is arranged in a position spaced a predetermined distance from a crankshaft, a couple of forces is generated by the primary inertial force of the crank mechanism and the inertial force of the balancer mechanism. Since the couple of forces is generated with a center of gravity of an engine as an instantaneous center of rotation, there is a disadvantage that there are generated vibrations turning with the center of gravity of the engine as the instantaneous center of rotation. Hereupon, with the arrangement disclosed in the Patent Document JP-A-2003-237674, an engine is held through a link in order to prevent vibrations caused by the couple of forces from being transmitted to the engine. More specifically, with JP-A-2003-237674, in the case where the engine is supported in an optional position other than the center of gravity of the engine, vibrations are not prevented from being generated in this position but the link prevents transmission of vibrations to a vehicle body. That is, vibrations themselves caused by the couple of forces generated in a position, in which the engine is supported, are not controlled and inhibited.

SUMMARY OF THE INVENTION

An object of the invention is to solve the aforementioned problems and to provide an engine with a balancer mechanism that can inhibit vibrations caused by a couple of forces generated by a primary inertial force of a crank mechanism and an inertial force of the balancer mechanism, in an optional position. Also, another object is to provide a motorcycle mounting thereon the engine.

The inventors of the present application have noticed that vibrations in a target position can be inhibited by positioning an instantaneous center of rotation in an optional target position of an engine. They has thought of the fact that a primary inertial force generated by the crank mechanism includes a rotating component and a translating component and an instantaneous center of rotation of an engine can be positioned in a target position by adjusting an acceleration caused by a couple of forces, which the rotating component balances an inertial force of the balancer mechanism to generate, and an acceleration caused by the translating component, and has finished the present invention.

That is, an engine with a balancer mechanism, in one aspect of the invention, comprises a crank mechanism, a balancer mechanism that inhibits vibrations caused by the crank mechanism, and an instantaneous center of rotation of the engine is arranged in the neighborhood of a predetermined target position by adjusting an acceleration caused by a translational force generated by a primary inertial force of the crank mechanism and an inertial force of the balancer mechanism and an acceleration caused by a couple of forces generated by the primary inertial force of the crank mechanism and the inertial force of the balancer mechanism.

With the engine with a balancer mechanism in the first aspect, an instantaneous center of rotation of the engine is arranged in the neighborhood of a predetermined target position by adjusting an acceleration caused by a translational force generated by a primary inertial force of the crank mechanism and an inertial force of the balancer mechanism and an acceleration caused by a couple of forces generated by the primary inertial force of the crank mechanism and the inertial force of the balancer mechanism. Therefore, vibrations caused by a couple of forces generated by the primary inertial force of the crank mechanism and the inertial force of the balancer mechanism are inhibited from generating in the neighborhood of the predetermined target position, in which an instantaneous center of rotation is arranged. As a result, vibrations caused by a couple of forces generated by the primary inertial force of the crank mechanism and the inertial force of the balancer mechanism can be inhibited in the neighborhood of an optional position (target position).

In the engine with a balancer mechanism in the first aspect, an acceleration caused by the translational force and an acceleration caused by the couple of forces are preferably adjusted so as to be put substantially in opposite directions and have substantially the same magnitude in the neighborhood of the predetermined target position, in which the instantaneous center of rotation is arranged. With such construction, an instantaneous center of rotation can be readily arranged in the neighborhood of an optional target position, so that vibrations caused by a couple of forces can be readily inhibited in the neighborhood of an optional target position.

In the engine with a balancer mechanism in the first aspect, the primary inertial force of the crank mechanism preferably defines a predetermined elliptical shape drawn by a locus, which corresponds to one cycle, in vectorial representation of the force. With such construction, by making use of the primary inertial force of the crank mechanism, which defines an elliptical-shaped vectorial locus in contrast to the inertial force of the balancer mechanism, which generally has a vectorial locus in the form of a perfect circle, it is possible to generate a translational force component. Thereby, it is possible to readily position an instantaneous center of rotation in the neighborhood of an optional target position with the use of an acceleration caused by the translational force and an acceleration caused by the couple of forces.

In the engine with a balancer mechanism, in which the primary inertial force of the crank mechanism defines a predetermined elliptical shape, preferably, the crank mechanism comprises a crankshaft, the balancer mechanism comprises a balancer shaft, a crank/balancer straight line, which connects between the balancer shaft and the crankshaft, is arranged to be made substantially in parallel to a center of gravity/target position straight line, which connects between a center of gravity of the engine and the predetermined target position, a major axis of an ellipse of the primary inertial force of the crank mechanism is arranged so as to be made substantially in parallel to the crank/balancer straight line, the inertial force of the balancer mechanism defines a substantially perfect circle shape drawn by a locus, which corresponds to one cycle, in vectorial representation of the force, and the perfect circle of the inertial force of the balancer mechanism is substantially the same in dimension as the major axis of the ellipse of the primary inertial force of the crank mechanism. With such construction, an instantaneous center of rotation can be further readily arranged in the neighborhood of an optional target position by controlling the elliptical shape of the primary inertial force of the crank mechanism so that an acceleration caused by the translational force and an acceleration caused by the couple of forces are put substantially in opposite directions and have substantially the same magnitude in the neighborhood of the predetermined target position.

In the engine with a balancer mechanism, in which the primary inertial force of the crank mechanism defines a predetermined elliptical shape, preferably, the crank mechanism further comprises a counterweight, and the elliptical shape of the primary inertial force generated by the crank mechanism is controlled by adjusting at least the counterweight. With such construction, the elliptical shape of the primary inertial force of the crank mechanism can be readily controlled to a predetermined elliptical shape by adjusting the counterweight in position and weight.

In the engine with a balancer mechanism in the first aspect, preferably, a pivot shaft that supports the engine is further provided, and the predetermined target position, in which the instantaneous center of rotation of the engine is arranged, corresponds to the pivot shaft. With such construction, since it is possible to inhibit the neighborhood of the pivot shaft from vibrating, there is no need for the provision of any link that restricts transmission of vibrations of the pivot shaft to the vehicle body frame, or the like in which the engine is mounted. Thereby, it is possible to reduce parts in number and to achieve lightening.

In the engine with a balancer mechanism in the first aspect, the balancer mechanism comprises a uniaxial balancer mechanism. With such construction, vibrations caused by a couple of forces in the neighborhood of an optional target position can be readily inhibited in the engine having a uniaxial balancer mechanism, in which vibrations caused by a couple of forces are liable to generate.

A motorcycle in a second aspect of the invention comprises the engine with a balancer mechanism, which can be configured as described above. With such construction, it is possible to obtain a motorcycle, in which vibrations caused by a couple of forces generated by a primary inertial force of the crank mechanism and an inertial force of the balancer mechanism can be inhibited in the neighborhood of an optional position (a target position).

In order to design an engine having the above construction, it is advantageous that the crank mechanism generate a predetermined primary inertial force ellipse, which causes a couple of forces and a translational force to balance in a target position (an instantaneous center of rotation). In addition, a principal axis direction $\chi$ and a major axis A of the primary inertial force ellipse of the crank mechanism can be freely set by adjusting an unbalanced weight (a crank unbalance (a counterweight) $k \cdot Wt$) of the crank mechanism in magnitude and phase.

The angle $\chi$ and the major axis A can be found by the following equation.

$$\beta = 360° - \psi_B \quad \text{Equation 6}$$
$$\eta = \frac{1}{2} \cdot \tan^{-1}\left(\frac{2 \cdot \lambda \cdot \sin\beta}{1 + 2 \cdot \lambda \cdot \cos\beta}\right)$$
$$\chi = 90° - (\eta + \psi_F)$$
$$A = \frac{\cos\eta + \lambda \cdot \cos(\beta - \eta)}{\cos\eta + 2 \cdot \lambda \cdot \cos(\beta - \eta)}$$

(where $\chi$ indicates an angle of a principal axis direction of an ellipse taken in a crankshaft rotation direction with a cylinder axis as a reference)

Hereupon, in performing the design, a primary inertial force is divided into a rotating component and a reciprocating component (a translating component), an acceleration of that couple of forces (a moment) in a target position, which the rotating component balances an inertial force of a balancer to generate, is found, and an acceleration of the reciprocating component is determined on the basis of a magnitude and a direction of a translational force, which is required in a crank position to balance the acceleration. A magnitude (k) and a phase (a) of that unbalanced weight (a crank unbalance) of a crank, which generates a primary inertial force ellipse having the rotating component and the reciprocating component, are determined, and a magnitude ($k_B$) and a phase of the balancer are determined.

The magnitude k and the phase $\alpha$ of the crank unbalance can be found by the following equation.

$$k = \frac{A \cdot \sin\chi}{\sin(\alpha - \chi)} = \frac{(A-1)\cos\chi}{\cos(\alpha - \chi)} \quad \text{Equation 7}$$
$$\alpha = \chi + \tan^{-1}\left[\frac{A}{A-1} \cdot \tan\chi\right]$$

It is finally understood that the design procedure described above is equivalent to using the following formulae (11) to (16') to find a principal axis direction $\chi$ and a major axis A of a primary inertial force ellipse of a crank and a magnitude $k_B$ of a balancer. Also, when these are found, a magnitude (k) and a phase ($\alpha$) of an unbalanced weight of a crank are also found from the formulae of asymmetrical crank. Accordingly, it suffices in a design apparatus for design of an engine according to the invention to store a program for the calculation and input a predetermined parameter to thereby enable determining elements of an engine. In this manner, it is possible to readily design an engine, in which vibrations are inhibited in a target position.

Equation 8

$$\lambda = \frac{I + M \cdot L_P \cdot L_C}{M \cdot L_P \cdot L_B} \quad \text{Equation (11)}$$

-continued $$\beta = 360° - \psi_B \quad \text{Equation (12)}$$

$$\eta = \frac{1}{2} \cdot \tan^{-1}\left(\frac{2 \cdot \lambda \cdot \sin\beta}{1 + 2 \cdot \lambda \cdot \cos\beta}\right) \quad \text{Equation (13)}$$

$$\chi = 90° - (\eta + \psi_F) \quad \text{Equation (14)}$$

$$A = \frac{\cos\eta + \lambda \cdot \cos(\beta - \eta)}{\cos\eta + 2 \cdot \lambda \cdot \cos(\beta - \eta)} \quad \text{Equation (15)}$$

$$= \frac{\lambda \cdot \sin(\beta - \eta)}{2 \cdot \lambda \cdot \sin(\beta - \eta) - \sin\eta} \quad \text{Equation (15')}$$

$$k_B = \frac{\lambda \cdot \cos\eta}{\cos\eta + 2 \cdot \lambda \cdot \cos(\beta - \eta)} \quad \text{Equation (16)}$$

$$= \frac{\lambda \cdot \sin\eta}{2 \cdot \lambda \cdot \sin(\beta - \eta) - \sin\eta} \quad \text{Equation (16')}$$

Furthermore, in the engine with a balancer mechanism in the third aspect of the invention, a vibration proof member is provided to lessen transmission of vibrations, which are caused by a secondary inertial force of the crank mechanism, outside of the target position.

Since the vibration proof member is thus provided in the target position, it is possible to lessen vibrations, which are caused by a first inertial force, in the target position and to inhibit transmission of vibrations, which are caused by a secondary inertial force, outside of the target position.

An aspect of the invention can also be adopted in an engine equivalent to a single cylinder. In addition, an engine equivalent to a single cylinder is not limited to one having one cylinder but includes ones, which can be regarded substantially as a single-cylinder engine, such as a two cylinder (or multi-cylinder), in which two or more pistons reciprocate in the same phase, a V-type engine, in which two connecting rods are connected to a crankshaft, etc.

The engine according an aspect of the invention is particularly suited to vehicles, and with an engine for vehicles, transmission of vibrations to a vehicle body frame from a location (for example, a pivot shaft), in which the engine is supported, can be inhibited when a target position is set in the neighborhood of the location.

In particular, with a scooter type vehicle (including two-wheeled, three-wheeled, and four-wheeled ones) having a unit swing type power unit, a vibration proof construction near a pivot shaft can be made simple when a target position is set in the neighborhood of the pivot shaft, which pivotally supports the power unit on a vehicle body to make the same freely swing. While many vehicles of this type connect a power unit and a vehicle body frame through a link to thereby achieve vibration isolation, vibrations in the neighborhood of the connection are inhibited in the invention, so that the link can be omitted according to design, in which case the construction is not only made simple but also stiffness in a suspension system can be increased to improve a traveling performance.

With such unit swing type engine, a crank/balancer straight line (a straight line connecting between a crankshaft and a balancer shaft) is made in parallel to a center of gravity/target position straight line (a line connecting between a center of gravity and a target position) to enable positioning the target position (a position of a pivot shaft) above or below a crankshaft, so that a quality of mounting on a vehicle body frame is improved.

Also, with a motorcycle, in which a foot rest (a foot rest base) is fixed to an engine, a target position is set in the neighborhood of a position of the foot rest whereby it is possible to inhibit vibrations transmitted to a driver's feet from the foot rest, thus contributing to an improvement in ride.

While it is general that a balancer mechanism rotates reversely to a crank mechanism at a constant velocity, such matter can be realized according to the design method of the invention even when a balancer shaft rotates in the same direction as a crankshaft does.

It is demonstrated that it suffices to design the engine with the use of the formulae (11) to (16'). Accordingly, since elements of the engine can be determined in this case by simply solving the formulae, the design procedure becomes very simple. In use of the formulae, a crank/balancer straight line is made in parallel to a center of gravity/target position straight line and a principal axis of a primary inertial force ellipse is made a direction of a balancer shaft (from a crankshaft) whereby the calculation is made exceedingly simple and calculation of a major axis A of the ellipse and other settings are made simple.

In order to execute the design, it is preferable to use a computer. In this case, it suffices to store a program for the calculation in a memory and to make computation with arithmetic device (CPU, etc.). The program preferably includes formulae of asymmetrical crank balance used to determine a phase of crank unbalance from results of calculation with the formulae (11) to (16').

A principle of an aspect of the invention will be described. Respective parameters are set as shown in FIG. 6.

There are the following two primary inertial forces generated in a uniaxial engine with a primary balancer mechanism.

(1) A primary inertial force of a crank mechanism: A resultant force of a primary inertial force caused by a reciprocating mass and an inertial force caused by a crank unbalance (unbalanced weight)

(2) An inertial force of a balancer mechanism: This is constant in magnitude and rotates relative to an inertial force of a crank mechanism in reverse phase and at a constant velocity.

A state, in which an inertial force caused by a balancer mechanism and a primary inertial force of a crank mechanism balance as a translational force at all times, corresponds to symmetric 50% balance obtained by adding 50% of a reciprocating mass (Wt) to a symmetric position of a crank pin, as described in JP-A-2003-237674. In this case, the translational force can be completely cancelled but a couple of forces is generated as described above.

The couple of forces generates an acceleration $a_m$ in a target position P in a tangential rotation direction of a center of gravity about an axis (an axis perpendicular to a plane of FIG. 6), that is, in a direction perpendicular to a center of gravity/target position direction (G-P straight line (FIG. 7).

Here, if a translational force having a magnitude of $a_m/M = F \cdot k_B \cdot L_B \cdot L_P \cdot \cos\theta/IM$ can be added to a center of gravity G in the same direction as that of the acceleration $a_m$ but in an opposite sense, the acceleration $a_m$ in the target position P in a translational direction can be cancelled. Accordingly, vibration by the primary inertial force becomes zero.

Here, F indicates an inertial force caused by a reciprocating mass, and $k_B$, $\theta$ . . . are as shown in FIG. 6.

Hereupon, in order to cancel the acceleration $a_m$ in the target position P, let think of dividing the primary inertial force of the crank mechanism into two components. Conversely, when this can be realized, it becomes apparent that the acceleration $a_m$ can be cancelled in the target position P.

(1) A force balancing the inertial force caused by the balancer mechanism to make a couple of forces (The force is constant in magnitude and rotates in the same direction as that of the inertial force of the balancer mechanism at a constant velocity. The force is referred below to as a rotating component.)

(2) A force canceling the acceleration $a_m$ caused by the couple of forces, in the target position P (The force is constant in direction and varies in magnitude in synchronism with a phase of the couple of forces. The force is referred below to as a reciprocating component.)

It will be demonstrated below that the above matter is possible. A translational force $F \cdot \sigma$ acting on a crankshaft C distant from a center of gravity G has two functions of the translational force ($F \cdot \sigma$) that acts on the center of gravity G as it is, and a couple of forces generated by a distance L between the both points G and C. Accordingly, an acceleration $a_r$, at which they act in the target position P, is $$a_r = F \cdot \sigma \cdot \cos\theta [1/M + L_C \cdot L_P/I]$$

$$= F \cdot \sigma \cdot \cos\theta [I + M \cdot L_C \cdot L_P]/IM$$

In order to achieve $a_m = a_r$, $$F \cdot k_B \cdot L_B \cdot L_P/I = F \cdot \sigma [I + M \cdot L_C \cdot L_P]/IM$$

$$k_B/\sigma = [I + M \cdot L_C \cdot L_P]/M \cdot L_B \cdot L_P \equiv \lambda$$

As a result, it is found that by making a magnitude ($k_B$) of the rotating component of the primary inertial force $\lambda$ times a magnitude (a) of the reciprocating component, an acceleration $a_r$, generated by the translational force can cancel an acceleration $a_m$ generated by the couple of forces in the assumption, that is, in the target position P. Here, $\lambda$ is $\lambda = (F \cdot k_B)/(F \cdot \sigma)$ and a ratio of magnitudes of the rotating component and the reciprocating component.

In collecting the above, it is meant that it suffices to satisfy the following three conditions.

(1) To make a ratio of magnitudes of the rotating component and the reciprocating component of the primary inertial force of the crank mechanism described above.

(2) To set a crank unbalance (a counterweight) in phase so that when the couple of forces is maximum (and 0), the reciprocating component for cancellation thereof becomes maximum (and 0).

(3) To make a direction of a force of the reciprocating component perpendicular to a straight line (G-P straight line), which connects between a center of gravity and a target position, and to make the direction opposite to an acceleration $a_m$ caused by the couple of forces.

(Find a Primary Inertial Force Ellipse)

A primary inertial force ellipse that satisfies the conditions can be found making use of formulae (formulae, by which an inertial force ellipse is found from crank balance) of asymmetrical crank balance shown in FIG. 12(A). Since the formulae are shown in, for example, "Machine Design", vol. 8, No. 9, pages 43-44, published by Nikkan Kogyo Newspaper Publishing Company, an explanation therefor is omitted and only results are used. As a result, it is possible to find the formulae (11), (12), (13). Here, $\eta$ in the formula (13) indicates a principal axis direction of a virtual inertial force, and the virtual principal axis direction $\eta$, an original principal axis direction $\chi$, and an angle $\Psi_F$ of the center of gravity/target position direction (G-P line direction) and a cylinder axis direction $\Psi_F$ are put in the relationship $\Psi_F + \chi + \eta = 90°$, so that the formula (14) is obtained.

In addition, the original principal axis direction $\chi$ is a principal axis direction of an inertial force, of which angle is taken in a crank rotation direction with the cylinder axis direction as a reference. Alto, the principal axis direction $\eta$ of a virtual inertial force is a principal axis direction of an inertial force, of which an angle is taken in a reverse direction to the crank rotation direction with a direction of a virtual reciprocating component ($F \cdot \sigma$) of an inertial force as a reference.

(Find a Major Diameter A and a Minor Diameter B of a Primary Inertial Force Ellipse, and a Magnitude $k_B$ of a Balancer)

The formulae (15), (15') are obtained from the formulae of asymmetrical crank balance. Also, making use of a major diameter A and a minor diameter B based on the formulae of asymmetrical crank balance, a magnitude a of a reciprocating component of a primary inertial force is represented by $$\sigma = k_B/\lambda = \cos\eta/[\cos\eta + 2\lambda\cos(\beta - \eta)]$$

$$= \sin\eta/[2\lambda\sin(\beta - \eta) - \sin\eta]$$

By the way, a rotating component ($F \cdot k_B$) of a primary inertial force is the same in magnitude as a magnitude of an inertial force of a balancer by definition. Also, since the rotating component ($F \cdot k_B$) and the reciprocating component ($F \cdot \sigma$) are $$\lambda = k_B/\sigma, \; k_B = \lambda \cdot \sigma$$

by definition, the formulae (16), (16') are obtained with the use of the equation of $\sigma$.

In order to find a direction (phase $\alpha$) and a magnitude (k) of crank balance from the principal axis direction $\chi$ of a primary inertial force ellipse and the diameter A (major diameter A) of the principal axis direction thus found, it suffices to make use of the formulae (formulae, by which crank balance is found from an inertial force ellipse) of asymmetrical crank balance shown in FIG. 12(B). More specifically, the magnitude k of crank balance can be found by substituting the principal axis direction $\chi$ found from the formula (14) and a value of the major diameter A found from the formula (15) or (15') into the formulae of asymmetrical crank balance.

Also, since a reciprocating component of a primary inertial force becomes zero when a couple of forces is zero, it suffices as described above to set a direction ($\alpha_B$) of a balancer so that "it is oriented in a direction of a crankshaft when a primary inertial force of a crank mechanism is oriented in a direction of a balancer shaft". While the direction $\alpha_B$ of a balancer can be found through calculation, such calculation becomes complicate and so is omitted.

Here, in the case where a center of a crankshaft and a center of a cylinder are offset $\delta$ in a crank rotation direction, an inertial force, etc. are shown in the following (1) to (8). In addition, it is assumed that r: crank radius and l: length of a connecting rod.

(1) Phase lag of a primary inertial force $\tau$: $\tau = \tan^{-1}(\delta/l)$ (2) Amplitude magnification of a primary inertial force $\epsilon$: $\epsilon = \{1 + (\delta/l)^2\}^{1/2}$ (3) A direction $\chi$ of a major axis of a primary inertial force is common to the case where there is no offset.

$$\chi = \chi_0 = 90° - (\eta + \Psi_F)$$

(4) A major diameter A of a primary inertial force ellipse increases by the amplitude magnification $\epsilon$ and is represented by the following equation.

$$A = \varepsilon \cdot A_0 = \varepsilon \cdot \frac{\cos\eta + \lambda \cdot \cos(\beta - \eta)}{\cos\eta + 2 \cdot \lambda \cdot \cos(\beta - \eta)} = \varepsilon \cdot \frac{\lambda \cdot \sin(\beta - \eta)}{2 \cdot \lambda \cdot \sin(\beta - \eta) - \sin\eta} \quad \text{Equation 9}$$

(5) A direction (angle) α of crank balance decreases by phase lag τ.

$$\alpha = \alpha_0 - \tau = \alpha_0 - \tan^{-1}(\delta/l)$$

(6) A direction (angle) $\alpha_B$ of a balancer increases by phase lag τ.

$$\alpha_B = \alpha_{B0} + \tau = \alpha_{B0} + \tan^{-1}(\delta/l)$$

(7) The magnitude k of crank balance is represented by the following equation.

$$k = \frac{(A-\varepsilon) \cdot \cos\chi}{\cos(\alpha_0 - \chi)} = \frac{(A-\varepsilon) \cdot \cos\chi}{\cos(\alpha - \tau - \chi)} \qquad \text{Equation 10}$$

$$= \frac{A \cdot \sin\chi}{\sin(\alpha_0 - \chi)} = \frac{A \cdot \sin\chi}{\sin(\alpha - \tau - \chi)}$$

(8) The magnitude $k_B$ of a balancer increases by the amplitude magnification ε and is represented by the following equation.

$$k_B = \varepsilon \cdot k_{B0} = \varepsilon \cdot \frac{\lambda \cdot \cos\eta}{\cos\eta + 2 \cdot \lambda \cdot \cos(\beta - \eta)} \qquad \text{Equation 11}$$

$$= \varepsilon \cdot \frac{\lambda \cdot \sin\eta}{2 \cdot \lambda \cdot \sin(\beta - \eta) - \sin\eta}$$

BRIEF DESCRIPTION OF THE DRAWINGS

FIG. 1 is a side view showing a scooter type motorcycle, on which an engine with a balancer mechanism according to a first embodiment of the invention is mounted.

FIG. 2 is a side view showing the engine with a balancer mechanism.

FIG. 3 is a view illustrating a method of arranging an instantaneous center of rotation of the engine with a balancer mechanism.

FIG. 4 is a view illustrating a method of arranging an instantaneous center of rotation of the engine with a balancer mechanism.

FIG. 5 is a view illustrating a method of arranging an instantaneous center of rotation of the engine with a balancer mechanism.

FIG. 6 is a view illustrating the positional relationship of respective points and a primary inertial force ellipse.

FIG. 7 is a view illustrating an acceleration caused by a couple of forces.

FIG. 8 is a view illustrating an acceleration caused by a reciprocating component of a primary inertial force.

FIG. 9 is a block diagram illustrating an example of a design apparatus according to the invention.

FIG. 10 is a view illustrating a concept of a design procedure according to the invention.

FIG. 11 is a view illustrating an actual design procedure according to the invention.

FIG. 12 is a view illustrating formulae of asymmetrical crank balance.

FIG. 13 is a schematic side view showing a state, in which an engine with a balancer mechanism according to a second embodiment of the invention is mounted.

FIG. 14 is a schematic view showing a crank mechanism of the engine.

FIG. 15 is a schematic view showing a bush of the engine.

FIG. 16 is a schematic side view showing a state, in which an engine with a balancer mechanism according to a third embodiment of the invention is mounted.

FIG. 17 is a schematic side view showing a state, in which an engine with a balancer mechanism according to a fourth embodiment of the invention is mounted.

DETAILED DESCRIPTION OF THE PREFERRED EMBODIMENTS

Below is a listing of reference numerals used herein.
1, 34: engine
1a: pivot shaft (target position)
1b: crank mechanism
1c: crankshaft
1g: counterweight
1h: balancer mechanism
1i: balancer shaft
22: bush (vibration proof member)
34: foot rest (target position)
36: vibration proof member
F1: primary inertial force of crank mechanism
F2: inertial force of balancer mechanism
L1: center of gravity/target position straight line
L2: crank/balancer straight line FIG. 1 is a side view showing a whole construction of a scooter type motorcycle (referred below to as "scooter"), on which an engine with a balancer mechanism according to a first embodiment of the invention is mounted. FIG. 2 is an enlarged side view showing a neighborhood of the engine of the scooter, on which the engine, shown in FIG. 1, with a balancer mechanism is mounted. FIGS. 3 to 5 are views illustrating a method of arranging an instantaneous center of rotation of the engine, shown in FIG. 2, with a balancer mechanism.

First, a construction of a scooter, on which an engine with a balancer mechanism according to a first embodiment of the invention is mounted, will be described with reference to FIGS. 1 to 3. In the scooter 2, on which the engine 1 (referred below to as "engine 1") with a balancer mechanism is mounted, a steering shaft of a front fork 4 is supported by a head pipe 3 to freely turn right and left. A front wheel 5 can be mounted rotatably on a lower end of the front fork 4 and a steering handle 6 can be mounted to an upper end of the steering shaft. Also, a vehicle body cover 7 can be provided in front of the head pipe 3.

A front end of a vehicle body frame 8 can be connected to the head pipe 3. The vehicle body frame 8 can be formed to reach a rear portion of the scooter 2 and can comprise an upper frame 8a and a pipe-shaped lower frame 8b. A front end of the lower frame 8b can be fixed to the upper frame 8a by bolts 9, and a connection bracket 10 is welded to a rear end of the lower frame. The connection bracket 10 can be fixed to the upper frame 8a by the bolts 11. Also, mounted through a bracket (not shown) to the lower frame 8b can be a radiator 12 that cools the engine 1. A cooling-water hose 13 can be mounted to the radiator 12, the cooling-water hose 13 being connected to the pipe-shaped lower frame 8b.

Mounted below a central portion of the upper frame 8a of the vehicle body frame 8 can be a fuel tank 14, and provided above the central portion is a seat 15. Provided below the seat 15 can be an accommodation box (not shown) that accommodates a helmet (not shown). Also, a foot rest 16 can be provided to be positioned between the seat 15 and the head pipe 3.

Also, a unit swing type engine unit 1 (referred simply below to as "engine 1") can be pivotally supported on a rear part of the vehicle body frame 8 to be able to swing up and down. A rear wheel 17 can be arranged rotatably on a rear end of the engine 1. A rear fender 18 can be mounted above the rear wheel 17 to cover an upper portion of the rear wheel 17. Also, a rear cushion 19 can be provided between a rear end of the vehicle body frame 8 and the rear end of the engine 1. Also, provided above the engine 1 can be an air cleaner 20, and mounted to a front part of the engine 1 can be a cooling-water hose 21 connected to a rear part of the pipe-shaped lower frame 8b. Accordingly, the radiator 12 and the engine 1 can be connected to each other through a cooling-water path composed of the cooling-water hose 13, the pipe-shaped lower frame 8b, and the cooling-water hose 21.

A pivot boss 1p can be formed on an upper wall of a transmission casing 1n of the engine 1 as shown in FIG. 2, the pivot boss 1p being supported through a pivot shaft 1a on the vehicle body frame 8 to be able to swing up and down.

Also, a piston 1f can be arranged on the engine 1 to freely reciprocate in a direction of cylinder axis, a small end of a connecting rod 1e is connected to the piston 1f, and a large end of the connecting rod 1e is connected to a crank arm of a crankshaft 1c through a crank pin 1d. Thereby, a crank mechanism 1b can be constituted to convert a reciprocating motion of the piston 1f into a rotating motion of the crankshaft 1c.

Also, a counterweight (a crank unbalance) 1g can be provided on the crankshaft 1c to rotate integrally with the crankshaft 1c. The counterweight 1g is arranged on an opposite side to the crank pin 1d. As described later, a rotating component and a translating component of a primary inertial force of the crank mechanism 1b can be adjusted by adjusting a magnitude, an arrangement, etc. of the counterweight 1g.

Also, provided on the engine 1 can be a uniaxial balancer mechanism 1h to restrict vibrations by the crank mechanism 1b. The balancer mechanism 1h comprises a balancer shaft 1i and a balancer weight 1j that rotates integrally with the balancer shaft 1i.

Here, according to the illustrated embodiment, arranged on the pivot shaft 1a can be an instantaneous center of rotation, at which vibrations caused by a primary inertial force F1 (see FIG. 3) of the crank mechanism 1b and an inertial force F2 (see FIG. 3) of the balancer mechanism 1h are not generated. Therefore, according to the illustrated embodiment, since vibrations caused by the primary inertial force F1 of the crank mechanism 1b and the inertial force F2 of the balancer mechanism 1h are not generated on the pivot shaft 1a, any link is not provided to restrict transmission of vibrations of the pivot shaft 1a to the vehicle body frame 8. Accordingly, according to the embodiment, the pivot shaft 1a of the engine 1 is supported directly on the vehicle body frame 8 not through a link.

Also, the embodiment adopts, as a method of arranging an instantaneous center of rotation on the pivot shaft 1a, a method, by which an acceleration caused by a translational force generated by the primary inertial force F1 of the crank mechanism 1b and the inertial force F2 of the balancer mechanism 1h and an acceleration caused by a couple of forces generated by the primary inertial force F1 of the crank mechanism 1b and the inertial force F2 of the balancer mechanism 1h balance (cancel) at a target position (the pivot shaft 1a), on which an instantaneous center of rotation should be arranged.

In this case, according to the illustrated embodiment, in order to generate a translational force component caused by the primary inertial force F1 of the crank mechanism 1b and the inertial force F2 of the balancer mechanism 1h, a position and a weight of the counterweight 1g can be adjusted to thereby control the primary inertial force F1 of the crank mechanism 1b so that a shape drawn by a locus corresponding to one cycle defines a predetermined elliptical shape in vectorial representation of the force. Also, a position and a weight of the balancer weight 1j are adjusted to thereby control the inertial force F2 of the balancer mechanism 1h so that a shape drawn by a locus corresponding to one cycle defines a perfect circle having a predetermined size in vectorial representation of the force.

A method of arranging the instantaneous center of rotation, described above, in the neighborhood of a predetermined target position (the pivot shaft 1a) will be described below in detail with reference to FIGS. 2 to 5. First, according to the embodiment, an axial center 1k of the balancer shaft 1i of the balancer mechanism 1h can be arranged, as shown in FIG. 3, relative to an axial center 1l of the crankshaft 1c of the crank mechanism 1b so as to be made in parallel to a center of gravity/target position straight line L1, which connects between an axial center 1m of the pivot shaft 1a and a center of gravity G of the engine 1. Also, the axial center 1k of the balancer shaft 1i of the balancer mechanism 1h can be arranged relative to the axial center 1l the crankshaft 1c of the crank mechanism 1b at a predetermined spacing in a direction from the axial center 1m of the pivot shaft 1a to the center of gravity G of the engine 1.

Also, a major axis of an ellipse S1 of the primary inertial force F1 of the crank mechanism can be is arranged on a crank/balancer straight line L2, which connects between the axial center 1l of the crankshaft 1c and the axial center 1k of the balancer shaft 1i. Also, a perfect circle S2 of the inertial force F2 of the balancer mechanism 1h can be configured to have a diameter, which is the same in magnitude as that of the major axis of the ellipse S1 of the primary inertial force F1 of the crank mechanism 1b. Also, a direction of the inertial force F2 of the balancer mechanism 1h can be configured to be opposite (opposite phase) to a direction of the primary inertial force F1 of the crank mechanism 1b.

Here, it is known that radii of the major axis and the minor axis of the ellipse S1 of the primary inertial force F1 of the crank mechanism 1b, respectively, are A×F [N] and (1−A)×F [N] where a ratio of the major axis and the minor axis of the ellipse S1 of the primary inertial force F1 of the crank mechanism 1b is major axis: minor axis=A:(1−A) and an inertial force caused by a mass of a reciprocating motion of the piston 1f (see FIG. 2) indicates F [N].

First, a ratio A of the major axis and the minor axis of the ellipse S1 of the primary inertial force F1 of the crank mechanism 1b is deduced. In this case, an E1 direction and an E2 direction, respectively, indicate directions perpendicular to and in parallel to the crank/balancer straight line L2, which connects between the axial center 1l of the crankshaft 1c and the axial center 1k of the balancer shaft 1i. Also, M [kg] indicates a mass of the engine 1 and I [kg·m$^2$] indicates an inertial moment of the engine 1. Also, p [m] indicates a distance from the center of gravity G of the engine 1 to the axial center 1m of the pivot shaft 1a, b [m] indicates a distance from a straight line L3 in parallel to the E1 direction to pass through the center of gravity G of the engine 1, to the axial center $1k$ of the balancer shaft $1i$, and c [m] indicates a distance from the straight line L3 to the axial center $1l$ of the crankshaft $1c$.

As shown in FIG. 3, an angle of the inertial force F2 of the balancer mechanism $1h$ is $\pi+\theta$ [rad] where $\theta$ [rad] indicates an angle of the primary inertial force F1 of the crank mechanism $1b$ relative to the crank/balancer straight line L2, which connects between the axial center $1l$ of the crankshaft $1c$ and the axial center $1k$ of the balancer shaft $1i$. At this time, a component $F1_{E1}$ of the primary inertial force F1 of the crank mechanism $1b$ in the E1 direction and a component $F1_{E2}$ in the E2 direction, respectively, become $F1_{E1}=(1-A)\times F\sin\theta$ [N] and $F1_{E2}=A\times F\cos\theta$ [N]. Also, a component $F2_{E1}$ of the inertial force F2 of the balancer mechanism $1h$ in the E1 direction and a component $F2_{E2}$ in the E2 direction, respectively, become $F2_{E1}=A\times F\sin(\pi+\theta)$ [N] and $F2_{E2}=A\times F\cos(\pi+\theta)$ [N].

Also, let consider an acceleration of the pivot shaft $1a$ with respect to the E1 direction and the E2 direction. First, let consider an acceleration of the pivot shaft $1a$ in the E1 direction.

A moment N caused on the axial center $1m$ of the pivot shaft $1a$ by a couple of forces about the center of gravity G is represented by the following equation (1) where a distance from the center of gravity/target position straight line L1, which connects between the center of gravity G of the engine 1 and an axial center $1m$ of the pivot shaft $1a$, to the axial center $1l$ of the crankshaft $1c$ and the axial center $1k$ of the balancer shaft $1i$ amounts to 1 [m].

$$N = F1_{E2} \times 1 + F2_{E2} \times 1 + F1_{E1} \times c + F2_{E1} \times b$$

$$= A \times F \cos\theta \times 1 + A \times F \cos(\pi+\theta) \times 1 + (1-A) \times F \sin\theta \times c + A \times F \sin(\pi+\theta) \times b \quad (1)$$

Here, since $\cos(\pi+\theta)=-\cos\theta$, $\sin(\pi+\theta)=-\sin\theta$, the equation (1) is represented by the following equation (2).

$$N = A \times F \cos\theta \times 1 - A \times F \cos\theta \times 1 + (1-A) \times F \sin\theta \times c - A \times F \sin\theta \times b$$

$$N = (1-A) \times F \sin\theta \times c - A \times F \sin\theta \times b \quad (2)$$

Also, an acceleration a1 and an angular acceleration $\beta$, respectively, which are caused by a couple of forces, in the E1 direction are represented by the following equations (3) and (4) where a1 [m/s$^2$] and $\beta$ [rad/s$^2$], respectively, indicate an acceleration and an angular acceleration, which are caused by a couple of forces on the axial center $1m$ of the pivot shaft $1a$ about the center of gravity G of the engine 1, in the E1 direction.

$$a1 = p \times \beta \quad (3)$$

$$\beta = N/I \quad (4)$$

Based on the equation (2), the equation (4) is represented by the following equation (5).

$$\beta = \{(1-A) \times F \sin\theta \times c - A \times F \sin\theta \times b\}/I \quad (5)$$

Based on the equations (3) and (5), the acceleration a1 caused by a couple of forces in the E1 direction is represented by the following equation (6).

$$a1 = p \times \beta$$
$$= p \times \{(1-A) \times F \sin\theta \times c - A \times F \sin\theta \times b\}/I \quad (6)$$

Also, an acceleration a2 of the axial center $1m$ of the pivot shaft $1a$, caused by a translational force in the E1 direction is represented by the following equation (7).

$$a2 = (F1_{E1} + F2_{E1})/M \quad (7)$$
$$= \{(1-A) \times F\sin\theta + A \times F\sin(\pi+\theta)\}/M$$
$$= \{(1-A) \times F\sin\theta - A \times F\sin\theta\}/M$$
$$= (1-2A) \times F\sin\theta/M$$

Here, in order that the pivot shaft $1a$ be made an instantaneous center of rotation of the engine 1, it is desired that the acceleration a1 caused by a couple of forces and the acceleration a2 caused by a translational force be reversed to each other in direction and caused to have the same magnitude whereby the acceleration a1 caused by a couple of forces and the acceleration a2 caused by a translational force in the E1 direction balance (cancel). That is, since it is necessary to satisfy a1+a2=0, the following equation results from the equations (6) and (7).

$$a1+a2=p \times \{(1-A) \times F \sin\theta \times c - A \times F \sin\theta \times b\}/I + (1-2A) \times F \sin\theta/M = 0$$

This is simplified to provide the following equation.

$$F \sin\theta [p \times \{(1-A) \times c - A \times b\}/I + (1-2A)/M] = 0$$

At this time, since $F \neq 0$, $\sin\theta[p \times \{(1-A) \times c - A \times b\}/I + (1-2A)/M]=0$ results. Here, when $\sin\theta \neq 0$ (the case of $\theta \neq 0, \pi$), the following equation (8) is satisfied.

$$p \times \{(1-A) \times c - A \times b\}/I + (1-2A)/M = 0 \quad (8)$$

By simplifying the equation (8), the following equation (9) indicative of the ratio A of the major axis and the minor axis of the ellipse S1 of the primary inertial force F1 of the crank mechanism $1b$ is deduced in the case where an instantaneous center of rotation is arranged on the pivot shaft $1a$.

$$A = (M \times p \times c + I)/\{M \times p(b+c) + 2I\} \quad (9)$$

Since with the engine 1 having an elliptical shape for the primary inertial force F1 of the crank mechanism $1b$, which satisfies the equation (9), it becomes possible to arrange an instantaneous center of rotation of the engine 1 in the neighborhood of the pivot shaft $1a$, it becomes possible in the engine 1 according to the embodiment to inhibit the pivot shaft $1a$ from vibrating.

Also, when $\sin\theta=0$ (the case of $\theta=0, \pi$) (see FIGS. 4 and 5), the accelerations a1 and a2, respectively, become a1=0 and a2=0 on the basis of the equations (6) and (7), so that a1+a2=0 is satisfied. In this case, it is also possible to inhibit the pivot shaft $1a$ from vibrating in the E1 direction.

Subsequently, let consider an acceleration of the pivot shaft $1a$ in the E2 direction. In order that the pivot shaft $1a$ be made an instantaneous center of rotation of the engine 1, it is required that an acceleration a3 [m/s$^2$] of the axial center $1m$ of the pivot shaft $1a$, caused by a couple of forces in the E2 direction and an acceleration a4 [m/s$^2$] of the axial center $1m$ of the pivot shaft $1a$, caused by a translational force in the E2 direction be reversed to each other in direction and caused to have the same magnitude whereby the acceleration a3 caused by a couple of forces and the acceleration a4 caused by a translational force in the E2 direction balance (cancel). That is, it is necessary to satisfy a3+a4=0. Here, since a component, in the E2 direction, of a couple of forces on the axial center $1m$ of the pivot shaft $1a$ about the center of gravity G of the engine 1 is 0, a3=0 results. Also, the acceleration a4 caused by a translational force in the E2 direction is represented by the following equation (10).

$$a4 = (F1_{E2} + F2_{E2})/M \quad (10)$$
$$= \{A \times F\cos\theta + A \times F\cos(\pi + \theta)\}/M$$
$$= \{A \times F\cos\theta - A \times F\cos\theta\}/M$$
$$= 0$$

Since this satisfies a3+a4=0, it becomes possible to inhibit the pivot shaft 1a from vibrating in the E2 direction.

As described above, when the ellipse S1 of the primary inertial force F1 of the crank mechanism 1b satisfies the equation (1), the pivot shaft 1a is made an instantaneous center of rotation of the engine 1, so that it is possible to inhibit the pivot shaft 1a from vibrating.

In addition, the equation (I) is the same as the formulae (15), (15'). That is, since ΨB=180°, β=360°−ΨB=180°, η=90° in the embodiment shown in FIG. 3, the formula (15') becomes as follows.

$$A = \frac{\lambda}{2\lambda + 1} \quad \text{Equation 12}$$
$$= \frac{I + M \cdot L_P \cdot L_C}{2I + M \cdot L_P(2L_C - L_B)}$$
$$= \frac{(M \cdot p \cdot c + I)}{M \cdot p(b + c) + 2I}$$

The formula becomes the equation (I). In transforming A in the equation, the relationship $L_P$=p, $L_C$=c, $L_C$−$L_B$=b is used as understood from comparison between FIGS. 6 and 3.

With the scooter 2 according to the embodiment, an instantaneous center of rotation of the engine 1 is arranged on the pivot shaft 1a by adjusting an acceleration caused by a translational force generated by the primary inertial force F1 of the crank mechanism 1b and the inertial force F2 of the balancer mechanism 1h, and an acceleration caused by a couple of forces generated by the primary inertial force F1 of the crank mechanism 1b and the inertial force F2 of the balancer mechanism 1h. Therefore, it is possible to inhibit generation of vibrations caused by a couple of forces, which is generated by the primary inertial force F1 of the crank mechanism 1b and the inertial force F2 of the balancer mechanism 1h, in the neighborhood of the pivot shaft 1a, on which an instantaneous center of rotation is arranged, so that it is possible to inhibit generation of vibrations caused by a couple of forces, which is generated by the primary inertial force F1 of the crank mechanism 1b and the inertial force F2 of the balancer mechanism 1h, in the neighborhood of the pivot shaft 1a.

Thereby, there is no need of the provision of any link that restricts transmission of vibrations of the pivot shaft 1a to the vehicle body frame 8 of the scooter 2, or the like. As a result, it is possible to reduce parts in number and to achieve lightening. In this case, since the engine 1 is firmly supported on the vehicle body frame 8, it is possible to improve manipulation in stability.

Also, when an instantaneous center of rotation of the engine 1 is arranged in a predetermined target position other than the pivot shaft 1a, vibrations caused by a couple of forces, which is generated by the primary inertial force F1 of the crank mechanism 1b and the inertial force F2 of the balancer mechanism 1h, are not generated in the neighborhood of the predetermined target position, in which an instantaneous center of rotation is arranged, so that it is possible to inhibit vibrations caused by a couple of forces, which is generated by the primary inertial force F1 of the crank mechanism 1b and the inertial force F2 of the balancer mechanism 1h, in the neighborhood of an optional position (target position).

Also, according to the embodiment, since an instantaneous center of rotation can be readily arranged in the neighborhood of the pivot shaft 1a by adjusting an acceleration caused by a translational force and an acceleration caused by a couple of forces so that they are reversed to each other in direction on the pivot shaft 1a, on which an instantaneous center of rotation is arranged, and have the same magnitude, it is possible to readily inhibit vibrations caused by a couple of forces in the neighborhood of the pivot shaft 1a.

Also, according to the embodiment, since by configuring the primary inertial force F1 of the crank mechanism 1b so that a shape drawn by a locus corresponding to one cycle defines a predetermined elliptical shape (an elliptical shape that satisfies the equation (9)) in vectorial representation of the force, a translational force component can be generated by that primary inertial force F1 of the crank mechanism 1b, which is elliptical in shape in contrast to that inertial force F2 of the balancer mechanism 1h, which defines a perfect circle, an instantaneous center of rotation can be readily arranged in the neighborhood of the pivot shaft 1a by the use of the acceleration caused by a translational force and the acceleration caused by a couple of forces.

Also, according to the embodiment, an instantaneous center of rotation can be readily arranged in the neighborhood of the pivot shaft 1a by arranging an axial center 1k of the balancer shaft 1i relative to an axial center 1l of the crankshaft 1c so as to be made in parallel to a center of gravity/target position straight line L1, which connects between an axial center 1m of the pivot shaft 1a and a center of gravity G of the engine 1, and to be spaced a predetermined spacing in a direction from the axial center 1m of the pivot shaft 1a toward the center of gravity G of the engine 1, arranging a major axis of an ellipse S1 of the primary inertial force F1 of the crank 1b in parallel to the crank/balancer straight line L2, which connects between the axial center 1l of the crankshaft 1c and the axial center 1k of the balancer shaft 1i, controlling the inertial force F2 of the balancer mechanism 1h so that a shape drawn by a locus corresponding to one cycle defines a perfect circle in vectorial representation of the force, and making a diameter of the perfect circle S2 of the inertial force F2 of the balancer mechanism 1h the same as that of the major axis of the ellipse S1 of the primary inertial force F1 of the crank mechanism 1b to thereby control the elliptical shape of the primary inertial force F1 of the crank mechanism 1b so that an acceleration caused by a translational force and an acceleration caused by a couple of forces are reversed to each other in direction and have the same magnitude in the neighborhood of the pivot shaft 1a.

Also, according to the embodiment, since the elliptical shape of the primary inertial force F1 by the crank mechanism 1b is controlled by adjusting the counterweight 1g, the elliptical shape of the primary inertial force F1 by the crank 1b can be readily controlled to a predetermined elliptical shape by adjusting a position and a weight of the counterweight 1g.

Also, according to the embodiment, by making the balancer mechanism 1h a uniaxial balancer mechanism 1h, vibrations caused by a couple of forces in the neighborhood of the pivot shaft 1a can be readily inhibited in the engine 1 having the uniaxial balancer mechanism 1h, in which vibrations caused by a couple of forces are liable to generate.

Subsequently, an explanation will be given to a design apparatus that designs an engine according to an embodiment invention. FIG. 9 is a block diagram illustrating an outline of the design apparatus, FIG. 10 is a view illustrating an operation of the design apparatus, that is, a concept of an arithmetic procedure, and FIG. 11 is a view illustrating an actual arithmetic procedure. The procedure in FIG. 10 corresponds to a design procedure shown in claim 16. Also, the procedure in FIG. 11 corresponds to a procedure shown in claim 17. In FIG. 9, the character 50 denotes a CPU being a computer to make arithmetic device, 52 a memory, in which an arithmetic program or the like is stored, 54 input device, and 56 output device.

According an embedment, since design can be made according to the procedure shown in claim 17, formulae (11) to (16'), formulae of asymmetrical crank balance, etc. used in this design are beforehand stored in the memory 52. Input from the input devoce 54 are data required for design of an engine, that is, a crank C, a balancer B, a center of gravity G, arrangement of a target position P, and M, I, $L_P$, $L_B$, $L_C$, $\Psi_B$, $\Psi_F$ shown in FIG. 6 (STEP S100 in FIGS. 10 and 11).

Subsequently, an acceleration $a_m$ of a couple of forces in the target position P is found (STEP S102 in FIG. 10), and a translational force $a_r$ in a crank position, which balances the acceleration $a_m$, is found (STEP S104 in FIG. 10). Further, by combining $a_m$ and $a_r$, a primary inertial force ellipse is found (STEP S106 in FIG. 10).

Since finding the primary inertial force ellipse is equivalent to finding a principal axis direction χ and a major axis A with the use of the formulae (11) to (16'), they are found in actual calculation with the formulae (14) and (15) (STEP S106A in FIG. 11).

When the primary inertial force ellipse is determined in this manner, the formulae of asymmetrical crank balance are used to find a magnitude k and a phase α of crank unbalance for generation of such ellipse (STEP S108 in FIG. 10 and STEP S108A in FIG. 11). Finally, a phase of a balancer is found (STEP S110 in FIGS. 10 and 11).

Since it is of course possible to find a phase of the balancer through calculation, it is of course possible to find the phase with the use of a calculating formula provided that the calculating formula is beforehand stored in the memory 52. Such calculation is after all equivalent to determining a phase of the balancer so that when a primary inertial force is oriented along a balancer shaft, an inertial force of the balancer is oriented along a crankshaft (STEP S110). In addition, a magnitude $k_B$ of the balancer is calculated simultaneously when a principal axis direction χ and a major axis A are found (STEP S106A). Results of calculation thus found are output to the output device 56 (STEP S112).

While it has been described that after the primary inertial force ellipse is found (STEP S106, STEP S106A), a magnitude k and a phase α of crank unbalance are found, the order of the calculation is not limited thereto. For example, by storing in the memory 52 the formulae of asymmetrical crank balance together with the formulae (11) to (16'), a necessary calculation can be made in one calculation. In this case, the order of the calculation does not matter. Also, since a phase of the balancer can be determined through calculation, calculation may be made with the formula of calculation stored in the memory 52.

The first embodiment has been described with the case where the pivot boss 1p provided on the upper wall of the transmission casing 1n of the unit swing type engine unit 1 is supported by the pivot shaft 1a to be able to swing up and down and an instantaneous center of rotation is positioned on the pivot shaft 1a.

However, according to an embodiment of the invention, an instantaneous center of rotation, in its turn, a position, in which a pivot shaft is arranged, is not limited to the position in the first embodiment but can be freely set.

FIGS. 13 to 15 are views illustrating a second embodiment, in which a pivot shaft is arranged below a transmission casing. In FIG. 13, a pivot boss 1p' is formed on a front part of a lower edge of a transmission casing 1n, the pivot boss 1p' being supported on a suspension bracket 8c, which is fixed to a vehicle body frame member 8b through a pivot shaft 1a, to be able to swing up and down.

In this embodiment, a counterweight of a crank mechanism 1b and a balancer weight of a balancer mechanism 1h are adjusted in magnitude and position so that an instantaneous center of rotation related to a primary inertial force of the crank mechanism 1b is positioned on the pivot shaft 1a.

On the other hand, a crankshaft 1c rotates in the crank mechanism 1b whereby a secondary inertial force F is generated and vibrations are generated thereby. Since vibrations caused by the secondary inertial force F has an allowable magnitude as compared with vibrations caused by the primary inertial force, any countermeasure for vibrations caused by the secondary inertial force is not taken in the first embodiment.

The second embodiment corresponds to vibrations caused by the secondary inertial force in order to further surely meet a demand for that improvement in comfortableness, which has been strongly demanded in scooters, etc. in recent years.

More specifically, the second embodiment can be configured so that the pivot shaft 1a supporting the pivot boss 1p' formed on the front part of the lower edge of the transmission casing 1n is made an instantaneous center of rotation related to a primary inertial force to thereby inhibit vibrations caused by the primary inertial force, and a bush 22 made of an elastic member lessens outside release of vibrations transmitted to the pivot shaft 1a by the secondary inertial force.

The bush 22 can comprise an elastic member 22c of rubber or the like baked and fixed between a metallic inner cylinder 22a and a metallic outer cylinder 22b. A pair of trimmed holes 22d, 22d can be formed on the elastic member 22c. The bush 22 can be interposed between the pivot boss 1p' and the pivot shaft 1a so that a direction, in which the trimmed holes 22d, 22d are arranged, is in agreement with a direction of an acceleration a caused by the secondary inertial force, as described later. By this, an elastic force in a direction of the acceleration can be decreased as compared with the elastic force in other directions.

Here, an acceleration a caused by the secondary inertial force F in the crank mechanism 1b to act on the pivot shaft 1a is found.

First, in FIG. 14 schematically showing the crank mechanism 1b, let assume $m_r$=a reciprocating mass, r=crank radius, ω=crank angular velocity, θ=crank phase, λ=a connecting-rod ratio (p/r), p=length of connecting rod, I=inertial moment, M=engine mass.

Also, in FIG. 13, let assume F=secondary inertial force, a=acceleration caused by the secondary inertial force to act on the pivot shaft 1a, g=distance from cylinder axis C to center of gravity G of the engine, h=distance from center of gravity G of the engine to instantaneous center D of rotation related to secondary inertial force, n=distance from instantaneous center D of rotation to the pivot shaft 1a, j=distance from center of gravity G of the engine to the pivot shaft 1a, Φ=apex angle of triangle 1a·G·D, and β=angular velocity about the instantaneous center D of rotation.

The acceleration a can be found by the following equation (17).

$$a = n \times \beta \quad (17)$$

Also, the secondary inertial force F, or the like can be found by the following equations.

$$F = m_r \times r \times \omega^2 \times \cos(2\theta)/\lambda,$$

$$\beta = F \times g/I$$

$$n = [j^2 \times h^2 - 2jh \times \cos(\Phi)]^{1/2}$$

$$h = I/(M \times g)$$

In the second embodiment, an elliptical shape of a primary inertial force F1 of the crank mechanism 1b and a circular shape of an inertial force F2 of the balancer mechanism 1h are controlled so that an acceleration caused by a translational force and an acceleration caused by a couple of forces are reversed to each other in direction and have the same magnitude on the pivot shaft 1a, or in the neighborhood thereof. Thereby, transmission of vibrations, which are caused by the primary inertial force of the crank mechanism 1b, from the pivot shaft 1a to the vehicle body frame 8 is inhibited.

Also, by interposing the bush 22 between the pivot shaft 1a and the pivot boss 1p', or between the pivot shaft 1a and the bracket 8c, it is possible to lessen the acceleration a caused by the secondary inertial force, in its turn, vibrations and to ensure a strength required for supporting the engine 1 on a vehicle body to ensure stability in traveling.

Here, the secondary inertial force F is in agreement with the cylinder axis C, and the acceleration a is oriented in substantially the same direction as that of the cylinder axis C, in its turn, the acceleration a. Therefore, the bush 22 is arranged so that a direction, in which the elastic force is small, is oriented in substantially the same direction as that of the cylinder axis C. In addition, while the acceleration a forms a relatively large angle relative to the cylinder axis C in FIG. 13, this is for the convenience in drawing the figure. More specifically, while the more distant the instantaneous center D of rotation related to the secondary inertial force from the cylinder axis C, the nearer the acceleration a oriented toward the cylinder axis C, FIG. 13 cannot but depict the instantaneous center D of rotation in a position considerably nearer to the cylinder axis C than actual because of a limitation in sheet size with the result that the acceleration a and the cylinder axis C intersect each other at the relatively large angle as described above.

While the second embodiment has been described with the case where the bush is adopted as a vibration proof member, in which an elastic force is directional in magnitude, it is possible to adopt various modifications for the vibration proof member according to the invention. FIG. 16 is a view illustrating a third embodiment, in which a link member is adopted as a vibration proof member, and the same characters as those in FIG. 13 denote the same parts as, or parts corresponding to those in the latter.

A link plate 37, which can constitute a vibration proof member, can be mounted through a mount bush 37b composed of a bearing 37a and an elastic member, to a bracket 8d fixed to a vehicle body frame member 8b. The mount bush 37b can be an ordinary one, of which an elastic force is not directional in magnitude, and can adopt one, in which, for example, the bush 22 shown in FIG. 15 is not provided with the trimmed holes 22d. Accordingly, the link plate 37 can be biased toward its neutral position (an axis of the bush 22) by the bias of the bush 22. In this manner, the link plate 37 becomes able to turn about a bearing 37a according to an amount of elastic deformation of the mount bush 37b. The engine 1 can be supported on a tip end of the link plate 37 through the pivot shaft 1a to be able to swing up and down.

In the third embodiment, the acceleration a caused by the secondary inertial force can be substantially the same in direction as the cylinder axis C. This can be the same with the second embodiment. The link 37 can be configured so that a direction of the acceleration a is in agreement with a direction, in which the pivot shaft 1a turns about the bearing 37a.

Accordingly, according to the third embodiment, since for the acceleration a caused by the secondary inertial force, the link plate 37 correctly turns about the bearing 37a within the range of elastic deformation of the mount bush 37b, vibrations generated by the secondary inertial force can be further surely prevented from being transmitted outside.

Also, since the link plate 37 can be allowed only to turn about the bearing 37a but inhibited to move in other directions, it is possible to surely support the engine 1 to contribute to an improvement in traveling stability.

In addition, while the bush 22 biases the link plate 37 to its neutral position in the third embodiment, for example, a spring member other than a bush may bias a link plate to its neutral position in the invention.

While the first to third embodiments have been described with the example, in which the engine 1 is supported on the vehicle body frame to be able to swing about a pivot shaft, the invention is also applicable to the case where an engine can be fixedly mounted to a vehicle body frame.

FIG. 17 is a schematic view illustrating a third embodiment of the invention, and the same characters as those in FIGS. 1 to 16 denote the same parts as, or parts corresponding to those in the latter.

A motorcycle 30 according to the embodiment can comprise a cradle type vehicle body frame 31. A head pipe 31a can be formed at a front end of the vehicle body frame 31 supports a front fork 4 to enable the same to be manipulated left and right, and a rear arm bracket 31b formed at a rear end of the vehicle body frame pivotally supports a rear arm 32 through a pivot shaft 33 to enable the same to swing up and down. A rear wheel 17 can be jounaled at a rear end of the rear arm 32.

A V-type two-cylinder engine 34 can be mounted centrally of the vehicle body frame 31. In the engine 34, front and rear pistons inserted into and arranged in front and rear cylinder bodies 34a, 34b are connected to a common crank pin of a crankshaft through front and rear connecting rods. In addition, with the V-type two-cylinder engine according to the embodiment, since a secondary inertial force F acts in a direction of a straight line, which passes through the crankshaft to divide a V bank into two halves, or a direction perpendicular thereto, the bisector is considered to be a cylinder axis C.

The engine 34 can be fixed to the vehicle body frame 31 directly, that is, without any elastic member therebetween, through a plurality of suspension brackets 31c formed on the vehicle body frame 31. That is, according to the third embodiment, the engine 34 and the vehicle body frame 31 can be joined together in a manner to constitute one rigid body as a whole. Accordingly, with the embodiment, an engine mass M in case of taking account of vibrations generated by a crank mechanism amounts to a sum of masses of the engine 34 and the vehicle body frame 31 joined rigidly thereto.

Also, left and right foot rests 35, on which a rider put feet, are fixed left and right of a lower portion of the vehicle body frame 31. Dampers 36 comprising an elastic member such as rubber, etc. for vibration absorption can be mounted on the foot rests 35. The dampers 36 are configured in the same manner as the second embodiment so that an elastic force in a direction of an acceleration a, which can be caused by a secondary inertial force of a crank mechanism 1b, is made smaller than elastic forces in other directions. In addition, the acceleration a in the third embodiment is found by the same equation as that in the second embodiment.

According to the fourth embodiment, the foot rests 35 can be selected as a target position, in which an instantaneous center of rotation based on a primary inertial force of the crank mechanism is to be arranged. That is, a counterweight of the crank mechanism and a balancer weight of a balancer mechanism can be adjusted in magnitude and position so that the foot rests 35 define an instantaneous center of rotation by a primary inertial force of the crank mechanism 1b. Accordingly, an elliptical shape of the primary inertial force F1 of the crank mechanism 1b and a circular shape of the inertial force F2 of the balancer mechanism are controlled so that an acceleration caused by the translational force and an acceleration caused by a couple of forces are reversed to each other in direction and have the same magnitude on the foot rests 35, or in the neighborhood thereof. Thereby, transmission of vibrations, which are caused by the primary inertial force of the crank mechanism, to the vehicle body frame is inhibited.

Further, according to the fourth embodiment, the dampers 36 can be mounted to the foot rests 35 in order to inhibit transmission of vibrations, which are caused on the foot rests 35 by the secondary inertial force, to a rider. Since the dampers 36 are structured so that an elastic force in a direction of the acceleration a, which is caused by the secondary inertial force, can be made smaller than elastic forces in other directions, it is possible to inhibit transmission of vibrations caused by the secondary inertial force to a rider.

In addition, the first to fourth embodiments are considered in all respects to be illustrative and not restrictive. A technical scope of the invention is indicated by the claims rather than the foregoing description of the embodiments, and all changes which come within the meaning and range of equivalence thereof are intended to be embraced therein.

While the embodiments show a scooter type motorcycle as an example of motorcycles and an example, in which a V-type engine is connected directly to a vehicle body frame, the scope of the invention is not limited thereto but applicable to other motorcycles than the above one provided that an engine with a balancer mechanism is provided.

Also, while the embodiments show an example, in which an engine with a balancer mechanism is mounted on a motorcycle, the invention is not limited thereto but an engine with a balancer mechanism may be mounted on other vehicles, machines, apparatuses, etc.

Also, while the embodiments show an example, in which an instantaneous center of rotation of an engine is arranged on a pivot shaft, or foot rests, or in the neighborhood thereof, the invention is not limited thereto but an instantaneous center of rotation of an engine may be arranged on other parts.

Also, while the embodiments show an example, in which a balancer shaft is arranged relative to a crankshaft in a direction from a pivot shaft to a center of gravity of an engine and a major axis of an ellipse of a primary inertial force of a crank mechanism is arranged substantially in parallel to a straight line, which connects between the crankshaft and the balancer shaft, the invention is not limited thereto but a balancer shaft may be arranged relative to a crankshaft in a direction from a center of gravity of an engine to a pivot shaft. In this case, a minor axis of an ellipse of a primary inertial force of a crank may be arranged substantially in parallel to a straight line, which connects between a crankshaft and a balancer shaft.

Also, while the embodiments show an example, in which an instantaneous center of rotation is arranged in the neighborhood of a pivot shaft whereby there is not provided any link that restricts transmission of vibrations of an engine (a pivot shaft) to a vehicle body frame of a scooter, the invention is not limited thereto but a link may be provided on a connection of a pivot shaft of an engine and a vehicle body frame even in the case where an instantaneous center of rotation is arranged in the neighborhood of the pivot shaft.

What is claimed is:

1. An engine comprising:
    a crank mechanism configured to convert reciprocating movements of a piston into a rotational movement, the crank mechanism including a counterweight arranged to rotate about an axial center of a crankshaft and to generate a primary inertial force by the reciprocating movements of the piston and a rotational movement of the counterweight; and
    a balancer mechanism including a balancer weight, the balancer mechanism arranged to generate an inertial force by a rotational movement of the balancer weight, the balancer weight arranged to rotate about an axial center of a balancer axis at a same speed as a speed of rotation of the counterweight and with a predetermined phase difference with respect to the counterweight so as to cause a translational force generated by the primary inertial force of the crank mechanism and the inertial force of the balancer mechanism; wherein
    the crank mechanism and the balancer mechanism are configured such that an acceleration caused by the translational force generated by the primary inertial force of the crank mechanism and the inertial force of the balancer mechanism is generated at or adjacent to a predetermined target position and such that an acceleration caused by a couple of forces generated by the primary inertial force of the crank mechanism and the inertial force of the balancer mechanism is generated at or adjacent to the predetermined target position; and
    in a side view along a crankshaft axis, a straight line passing through the balancer axis and the crankshaft axis is either substantially parallel to, or defines an angle with respect to, a straight line passing through a center of gravity of the engine and the predetermined target position.

2. The engine as recited in claim 1, wherein the crank mechanism and the balancer mechanism are configured such that the acceleration caused by the translational force generated by the primary inertial force of the crank mechanism and the inertial force of the balancer mechanism, and the acceleration caused by the couple of forces generated by the primary inertial force of the crank mechanism and the inertial force of the balancer mechanism, are generated so as to be substantially in opposite directions and have substantially a same magnitude at or adjacent to the predetermined target position.

3. The engine as recited in claim 2, wherein the crank mechanism is configured such that the primary inertial force of the crank mechanism defines a predetermined elliptical shape drawn by a locus, which corresponds to one cycle, in vectorial representation of the force.

4. The engine as recited in claim 1, wherein the straight line passing through the balancer axis and the crankshaft axis is substantially parallel to the straight line passing through the center of gravity of the engine and the predetermined target position.

5. The engine as recited in claim 1, further comprising a pivot shaft that supports the engine, wherein the predetermined target position corresponds to a position of the pivot shaft.

6. The engine as recited in claim 1, wherein the balancer mechanism comprises a uniaxial balancer mechanism.

7. The engine as recited in claim 1, wherein the straight line passing through the balancer axis and the crankshaft axis defines an angle with respect to the straight line passing through the center of gravity of the engine and the predetermined target position.

8. The engine as recited in claim 1, further comprising a foot rest fixed to the engine, wherein the foot rest is located at or adjacent to the predetermined target position.

* * * * *